United States Patent
Omata et al.

(10) Patent No.: US 12,195,633 B2
(45) Date of Patent: Jan. 14, 2025

(54) INK-JET INK AND METHOD FOR FORMING IMAGE

(71) Applicant: Konica Minolta, Inc., Tokyo (JP)

(72) Inventors: Takenori Omata, Kokubunji (JP); Akio Maeda, Akishima (JP)

(73) Assignee: KONICA MINOLTA, INC., Tokyo (JP)

( * ) Notice: Subject to any disclaimer, the term of this patent is extended or adjusted under 35 U.S.C. 154(b) by 323 days.

(21) Appl. No.: 17/758,986

(22) PCT Filed: Feb. 10, 2021

(86) PCT No.: PCT/JP2021/004860
§ 371 (c)(1),
(2) Date: Jan. 30, 2023

(87) PCT Pub. No.: WO2021/172007
PCT Pub. Date: Sep. 2, 2021

(65) Prior Publication Data
US 2023/0193062 A1      Jun. 22, 2023

(30) Foreign Application Priority Data

Feb. 28, 2020   (JP) ................................ 2020-032620

(51) Int. Cl.
  *B41J 2/14*   (2006.01)
  *B41J 2/18*   (2006.01)
  (Continued)

(52) U.S. Cl.
  CPC ................ *C09D 11/38* (2013.01); *B41J 2/14* (2013.01); *B41J 2/18* (2013.01); *C09D 11/322* (2013.01); *B41J 2202/12* (2013.01)

(58) Field of Classification Search
  CPC ... B41J 2/14; B41J 2/14209; B41J 2/18; B41J 2202/12; C09D 11/14; C09D 11/322; C09D 11/38
  See application file for complete search history.

(56) References Cited

U.S. PATENT DOCUMENTS

| | | | |
|---|---|---|---|
| 2004/0110865 A1 | 6/2004 | McCovick et al. | |
| 2017/0051150 A1 | 2/2017 | Kawaharada et al. | |
| 2020/0115577 A1* | 4/2020 | Bando | C09D 11/101 |

FOREIGN PATENT DOCUMENTS

| | | |
|---|---|---|
| CN | 105473339 A | 4/2016 |
| CN | 109661311 A | 4/2019 |
| JP | H08-325491 A | 12/1996 |
| JP | 2003-089762 A | 3/2003 |
| JP | 2011-158828 A | 8/2011 |

(Continued)

OTHER PUBLICATIONS

Office Action issued for the related Chinese patent application No. 202180017251.9, dated Sep. 28, 2023, along with its English translation.

(Continued)

*Primary Examiner* — Anh T Vo
(74) *Attorney, Agent, or Firm* — LUCAS & MERCANTI, LLP

(57) ABSTRACT

An inkjet ink contains an aqueous solvent, a pigment, and thixotropy-imparting agent, having a viscosity at 25° C. at a shear rate of 1000 (1/s) of 15 mPa·s or less, and a viscosity at 25° C. at a shear rate of 1 (1/s) of 150 mPa·s or more in a state where the aqueous solvent is removed from the inkjet ink so that a mass is 80% of an initial mass of the inkjet ink.

17 Claims, 3 Drawing Sheets

(51) Int. Cl.
  *C09D 11/322* (2014.01)
  *C09D 11/38* (2014.01)

(56) References Cited

FOREIGN PATENT DOCUMENTS

| JP | 2011-225859 A | 11/2011 | |
| JP | 2015086192 * | 5/2015 | ............... A61K 8/25 |
| JP | 2018-089796 A | 6/2018 | |
| JP | 2018-202768 A | 12/2018 | |
| JP | 2020015891 * | 1/2020 | ............. C09D 11/16 |
| WO | 2021/172008 A1 | 9/2021 | |
| WO | 2022/168226 A1 | 8/2022 | |

OTHER PUBLICATIONS

Office Action dated Feb. 16, 2023 for the corresponding Chinese Application No. 202180017251.9, with English translation.

Extended European Search Report dated Jul. 14, 2023 for the corresponding European Application No. 21761190.4, with English translation.

International Preliminary Report on Patentability for the corresponding application No. PCT/JP2021/004860 dated Aug. 30, 2022, with English translation.

PCT, International Search Report for the corresponding application No. PCT/JP2021/004860, dated May 11, 2021, with English translation.

Office Action issued for the related Chinese patent application No. 202180017251.9, dated Jun. 10, 2023, along with its English translation, 32 pages.

Chinese Patent Office, "Dicision of dismissal" dated Jan. 30, 2024, which was issued for the corresponding Chinese Patent Application No. 202180017251.9, with English translation, 32 pages.

Notice of Reasons for Refusal, dated Nov. 26, 2024, issued for the corresponding Japanese Patent Application No. JP 2022-503242, 11 pages, with English translation.

* cited by examiner

INK-JET INK AND METHOD FOR FORMING IMAGE

CROSS REFERENCE TO RELATED APPLICATION

This Application is a 371 of PCT/JP2021/004860 filed on Feb. 10, 2021, which, in turn, claims priority of Japanese Patent Application No. 2020-032620 filed on Feb. 28, 2020, and the above applications are incorporated herein by reference.

TECHNICAL FIELD

The present invention relates to an inkjet ink and an image forming method. More particularly, the present invention relates to an inkjet ink that enables both maintenance of good ejection performance and high-quality image formation, and to an image forming method using an inkjet method that enables formation of a high-quality image with good workability.

BACKGROUND TECHNOLOGY

In image formation by the inkjet method, an inkjet ink (hereinafter simply referred to as an "ink") is ejected from the inkjet head (hereinafter simply referred to as a "head") onto the substrate. After the droplets land on the substrate, the solvent is dried to form a coating film (image). When an image is formed on a non-absorbent substrate such as PET (polyethylene terephthalate) using this inkjet method, adjacent ink droplets may be pulled together after the ink lands on the substrate and before it dries, resulting in a thread-like defect. In the case of different adjacent ink droplets, bleeding occurs due to color mixing.

To solve such problems, a heated platen could be introduced into the imaging device to instantly dry and thicken the solvent after the ink lands on the substrate. However, to prevent the above bleeding from occurring, the platen must be heated to a high temperature, which causes ink to adhere around the head as it dries on the meniscus surface of the head, resulting in a problem of poor ejection.

In addition, the following image formation is disclosed in which an additive is added to the ink to give it thixotropy, and the ink circulates in the head, causing it to shear and become low viscosity, but in the low-shear state where the ink is ejected and landed on the substrate, the viscosity becomes higher and the ink is less absorbed by the absorbent substrate, resulting in high concentration without platen heating.

For example, Patent Document 1 describes a water-based inkjet ink in which the ink viscosity at low shear is 1.5 times higher than the ink viscosity at high shear by adding a water-soluble polymer compound to give the ink thixotropy. Patent Document 1 describes that this ink is low viscosity at high shear when it is circulated and ejected by the head, but becomes high viscosity at low shear when it lands, preventing the density from being reduced by the absorbing substrate. However, there is no description in Patent Document 1 that attempts to control ink thickening by combining the thixotropy of the ink itself with drying conditions. It is assumed that it is not possible to achieve both good ejection performance and high-quality image formation only by the method of controlling the thixotropic property of the ink itself as described in Patent Document 1.

PRIOR ART DOCUMENTS

Patent Documents

Patent Document 1: JP-A 2011-225859

SUMMARY OF THE INVENTION

Problem to be Solved by the Invention

The present invention was made in view of the above problems and circumstances, and an object of the present invention is to provide an inkjet ink that enables both maintenance of good ejection performance and high-quality image formation. The object of the present invention is also to provide an image forming method that makes it possible to form high-quality images with good workability in image formation by the inkjet method.

Means to Solve the Problems

In order to solve the above problem, in the process of studying the cause of the above problem and other factors, the present inventor set the index of viscosity (25° C.) of the inkjet ink at high shear rate when circulating in the inkjet ink head to be 15 mPa·s or less at a shear rate 1000 (1/s). Furthermore, the index of viscosity (25° C.) at low shear rate at the time of landing was set to be 150 mPa·s or more at a shear rate of 1 (1/s) in a state where the aqueous solvent is removed from the inkjet ink so that the mass is 80% of the initial mass. Then, by preparing the inkjet ink so as to satisfy the above two conditions by using the thixotropy-imparting agent, it is possible to obtain an inkjet ink capable of maintaining good ejection performance and forming a high-quality image. Thus, the present invention has been achieved. That is, the above-mentioned object according to the present invention is solved by the following means.

1. An inkjet ink comprising an aqueous solvent, a pigment, and a thixotropy-imparting agent, having a viscosity at 25° C. at a shear rate of 1000 (1/s) of 15 mPa·s or less, and a viscosity at 25° C. at a shear rate of 1 (1/s) of 150 mPa·s or more in a state where the aqueous solvent is removed from the inkjet ink so that a mass is 80% of an initial mass of the inkjet ink.

2. The inkjet ink according to item 1, wherein in a state where the aqueous solvent is removed from the inkjet ink so that a mass is 80% of an initial mass of the inkjet ink, and when a distortion is changed under measurement conditions where a temperature is 25° C., an angular frequency ω is 10 rad/s, and a swing angle γ is 1 to 1000%, a loss tangent (tan δ) is less than 1 at 1% distortion.

3. The inkjet ink according to item 1 or 2, wherein in a state where the aqueous solvent is removed from the inkjet ink so that a mass is 80% of an initial mass of the inkjet ink, and when a distortion is changed under measurement conditions where a temperature is 25° C., an angular frequency ω is 10 rad/s, and a swing angle γ is 1 to 1000%, a crossover distortion between a storage elastic modulus and a loss elastic modulus is 20% or more.

4. The inkjet ink according to any one of items 1 to 3, having a thixotropy index represented by n in the following viscosity equation of Equation (2) is 0.85 or less, $$\eta a = \mu D^{n-1} \qquad \text{Equation (2):}$$

in Equation (2), ηa represents an apparent viscosity; D represents a shear rate; u represents a non-Newtonian viscosity coefficient.

5. The inkjet ink according to any one of items 1 to 4, wherein an aspect ratio of the thixotropy-imparting agent is 20 or more.

6. The inkjet ink according to any one of items 1 to 5, wherein the thixotropy-imparting agent contains a polysaccharide or inorganic particles.

7. The inkjet ink according to any one of items 1 to 6, wherein the thixotropy-imparting agent contains a cellulose nanofiber or a smectite clay mineral.

8. The inkjet ink according to any one of items 1 to 7, wherein the thixotropy-imparting agent is composed of two or more materials.

9. The inkjet ink according to item 8, wherein the thixotropy-imparting agent contains a smectite clay mineral.

10. The inkjet ink according to item 8, wherein the thixotropy-imparting agent contains a smectite clay mineral and a cellulose nanofiber.

11. The inkjet ink according to any one of items 1 to 10, further containing a fixing resin, wherein the thixotropy-imparting agent is contained in the range of 0.01 to 1 mass % and a total solid content of thixotropy-imparting agent is in the range of 6 to 30 mass % with respect to the total inkjet ink.

12. An image forming method comprising the step of: ejecting droplets of an inkjet ink from an inkjet head equipped with an ink circulation mechanism and landing the droplets of the inkjet ink on a substrate, wherein the inkjet ink contains an aqueous solvent, a pigment, and a thixotropy-imparting agent, and the inkjet ink is circulated in the inkjet head so that a viscosity of the inkjet ink is 15 mPa·s or less, and when the droplets of the inkjet ink are landed on the substrate, or immediately after landing of the droplets of the inkjet on the substrate, a mass loss of the droplets of the inkjet ink from the inkjet ink is 20% or less, and a viscosity of the droplets of the inkjet ink is 150 mPa·s or more.

13. The image forming method according to item 12, using the inkjet ink according to any one of items 1 to 11.

14. The image forming method according to item 12 or 13, wherein the substrate is a non-absorbent substrate.

15. The image forming method according to any one of items 12 to 14, wherein the landing step of the droplets of the inkjet ink contains a process of heating the droplets on the substrate in the range of 30 to 60° C.

16. The image forming method according to any one of items 12 to 15, wherein the immediately after landing of the droplets of the inkjet ink is a period within 100 msec after the droplet lands on the substrate.

17. The image forming method according to any one of items 12 to 16, wherein the inkjet head is provided with:
a pressure chamber into which the inkjet ink is injected via an injection path;
a pressure generating device for causing a pressure fluctuation in the pressure chamber;
a nozzle that communicates with the pressure chamber and serves as a flow path for the inkjet ink ejected from the pressure chamber to the outside due to pressure fluctuation in the pressure chamber; and
two or more circulation paths that communicate with the pressure chamber, eject the inkjet ink inside the nozzle, and return the inkjet ink to the injection path.

Effects of the Invention

The above means of the present invention may provide an inkjet ink that may both maintain good ejection performance and form high-quality images. It is also possible to provide an image forming method that makes it possible to form a high-quality image with good workability in image formation by the inkjet method. Although the expression mechanism or action mechanism of the effect of the present invention has not been clarified, it is inferred as follows.

The inkjet ink of the present invention has a viscosity (25° C.) at a shear rate of 1000 (1/s) of 15 mPa·s or less. This viscosity is a viscosity at which the ink may be smoothly circulated in and ejected from the head.

The ink of the present invention has a viscosity (25° C.) at a shear rate of 1 (1/s) of 150 mPa·s or more in a state where the aqueous solvent is removed from the inkjet ink so that a mass is 80% of an initial mass of the inkjet ink (hereinafter, this state is referred to as an "ink drying rate of 20%"). If the viscosity at the ink drying rate of 20% is in the above range, good pinning is possible without excessive removal of aqueous solvent from the ink at the time of landing, and the resulting image may be of high quality. In other words, the ink of the present invention has a high viscosity required for good pinning even at an ink drying rate of 20%. This allows a large amount of aqueous solvent to remain in the ink from the time of ejection to the time of landing, which suppresses the adhesion of ink solids around the head, prevents ejection defects, and facilitates maintenance.

The image forming method of the present invention comprises a landing step of ejecting droplets of the inkjet ink from an inkjet head provided with an ink circulation mechanism and landing the droplets of the inkjet ink on a substrate. The inkjet ink is circulated in the head so that its viscosity is 15 mPa·s or less. This viscosity is a viscosity at which the ink may be circulated in and ejected from the head smoothly.

In the image forming method of the present invention, the landing step is performed so that the mass loss rate of the ink droplets when landing on the substrate or immediately after landing from the ink circulating in the head is within 20% and the viscosity of the ink droplets is 150 mPa·s or more. When the mass loss rate and viscosity of the ink droplets when it lands on the substrate or immediately after landing are within the above ranges, good pinning is possible and the resulting image may be of high quality. In addition, the sticking of the solid ink content around the head is suppressed, ejection defects are less likely to occur, and maintenance is easier.

EMBODIMENTS TO CARRY OUT THE INVENTION

Figure 1:
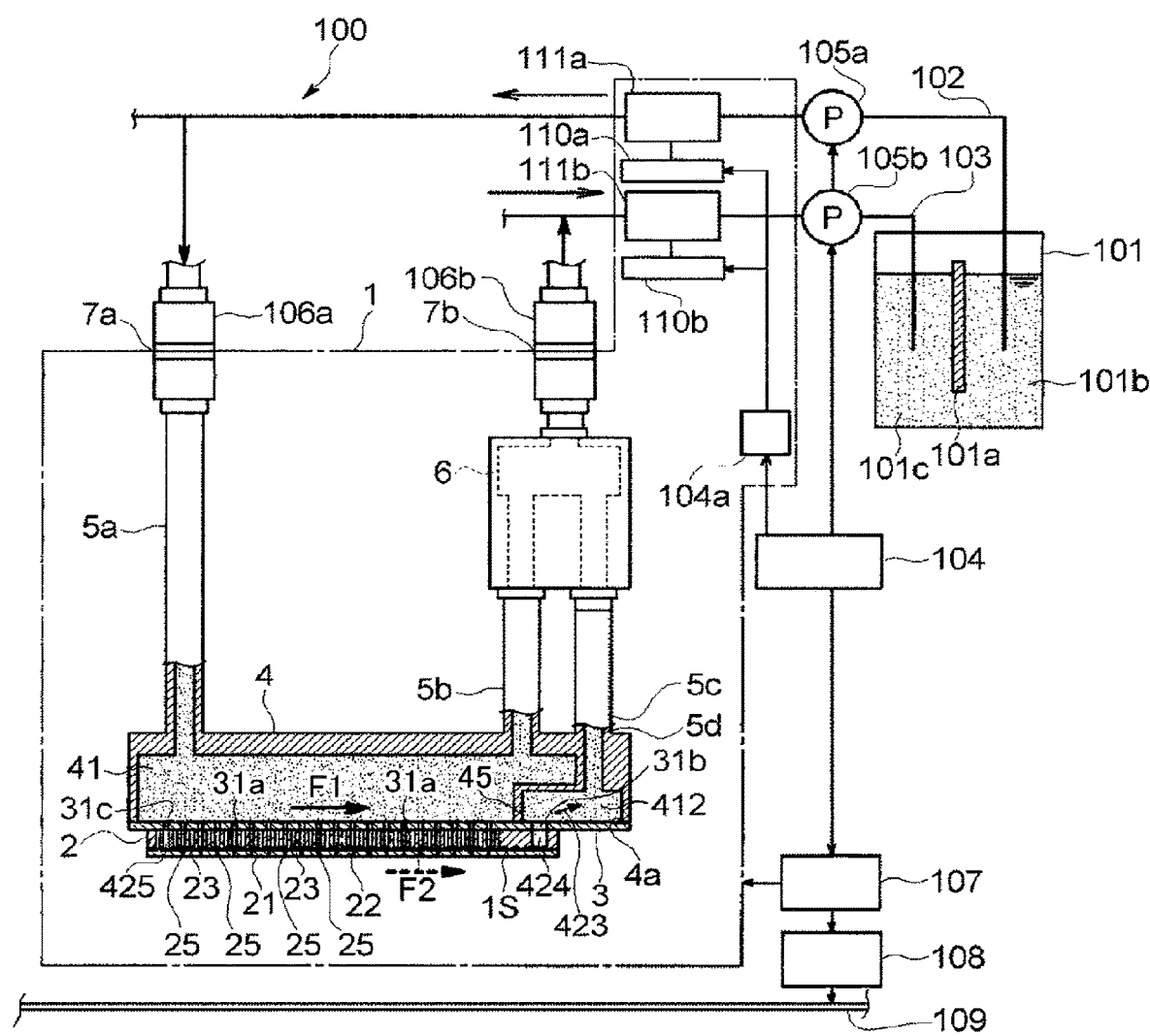
FIG. 1 is a schematic diagram of an inkjet image forming apparatus equipped with an example of an inkjet head that may be used for the image forming method of the present invention.

The inkjet ink of the present invention is an inkjet ink containing an aqueous solvent, a pigment and a thixotropy-imparting agent, and has a viscosity (25° C.) at a shear rate of 1000 (1/s) of 15 mPa·s or less, and a viscosity (25° C.) at a shear rate of 1 (1/s) of 150 mPa·s or more in a state where the aqueous solvent is removed from the inkjet ink so that to have a 80 mass % of the initial mass of the inkjet ink. This feature is a technical feature common to each of the following embodiments of the inkjet ink of the present invention.

As an embodiment of the ink of the present invention, from the viewpoint of both maintaining good ejection performance and high-quality image formation, it is preferable that the loss tangent (tan δ) at 1% distortion is less than 1 at an ink drying rate of 20%, at a temperature of 25° C., an angular frequency of ω of 10 rad/s, and a swing angle of γ of 1 to 1000%. The crossover distortion between the storage elastic modulus and the loss elastic modulus when the distortion is varied is preferably 20% or more. Furthermore, from the same viewpoint as above, it is preferable that the inkjet ink of the present invention has a thixotropy index represented by n in the viscosity equation expressed by the above Formula (2) of 0.85 or less.

As an embodiment of the ink of the present invention, it is preferred that the aspect ratio of the thixotropy-imparting agent is 20 or more from the viewpoint of both maintaining good ejection performance and high-quality image formation. Furthermore, it is preferred that the thixotropy-imparting agent contains a polysaccharide or inorganic particles, and it is more preferred that it contains a cellulose nanofiber or a smectite clay mineral. From the same viewpoint as above, it is also preferred that the thixotropy-imparting agent comprises two or more materials, in which case one of the two or more materials of the thixotropy-imparting agent is a smectite clay mineral. It is more preferred that the thixotropy-imparting agent comprises a smectite clay mineral and a cellulose nanofiber.

As an embodiment of the ink of the present invention, from the viewpoint of both maintenance of good ejection performance and high-quality image formation, the inkjet ink further contains a fixing resin. It is preferable that the thixotropy-imparting agent is contained in the range of 0.01 to 1 mass %, the total solid content is contained in the range of 6 to 30 mass %, and the aqueous solvent is contained in the range of 50 to 90 mass % with respect to the total amount of the inkjet ink.

The image forming method of the present invention comprises a landing step of ejected droplets of the inkjet ink from an inkjet head provided with an ink circulation mechanism and landing the droplets of the inkjet ink on a substrate. Wherein the inkjet ink contains an aqueous solvent, a pigment and a thixotropy-imparting agent and is circulated in the inkjet head so that its viscosity is 15 mPa·s or less. When the droplets are landed on the substrate or immediately after landing, the landing step is performed so that the mass loss rate is within 20% from the inkjet ink and to have a viscosity of 150 mPa·s or more. This feature is a technical feature common to each of the following embodiments of the image forming method of the present invention.

As an embodiment of the image forming method of the present invention, it is preferable to use the inkjet ink of the present invention as an inkjet ink from the viewpoint of further expressing the effect of the present invention.

The effect of the present invention is more pronounced and preferred when the substrate is a non-absorbent substrate.

As an embodiment of the image forming method of the present invention, from the viewpoint of further expressing the effect of the invention, it is also preferable that the landing step contains heating the droplets on the substrate in the range of 30 to 60° C. Further, it is preferable the timing of the immediately after the landing is a period within 100 msec after landing on the substrate.

As an embodiment of the image forming method of the present invention, from the viewpoint of further expressing the effect of the invention, the inkjet head is preferably provided with: a pressure chamber into which the inkjet ink is injected via an injection path: a pressure generating device for generating pressure fluctuation in the pressure chamber; a nozzle that communicates with the pressure chamber and serves as a flow path for the inkjet ink ejected from the pressure chamber to the outside due to pressure fluctuation in the pressure chamber; and two or more circulation paths that communicate with the pressure chamber, eject the inkjet ink inside the nozzle, and return the inkjet ink to the injection path.

The following is a detailed description of the invention, its components, and the form and embodiment for carrying out the present invention. In this application, the term "to" is used in the sense of including the numerical values described before and after "to" as lower and upper limits, respectively.

[Outline of Inkjet Ink]

<Physical Properties of Inkjet Ink>

The inkjet ink of the present invention contains an aqueous solvent, a pigment and a thixotropy-imparting agent, and satisfies the following conditions (1-1) and (1-2) with respect to viscosity characteristics.

(1-1) The viscosity (25° C.) at a shear rate of 1000 (1/s) is 15 mPa·s or less.

(1-2) At an ink drying rate of 20%, the viscosity (25° C.) at shear rate 1 (1/s) is 150 mPa·s or more.

In (1-1) and (1-2) above, the viscosity may be measured by a rotational viscometer. For example, MCR-102 manufactured by Anton Paar Corporation may be cited as a rotational viscometer. In the present specification, unless otherwise specified, the viscosity indicates the viscosity measured at 25° C.

In the present specification, an aqueous solvent is water or a solvent containing water and an aqueous solvent. An aqueous solvent is a solvent that is compatible with water at room temperature.

An ink drying rate of 20% represents the state in which the aqueous solvent is removed from the inkjet ink so that the mass is 80% of the initial mass. The ink drying rate may be calculated using the following Formula (A) from the mass before and after drying when the ink is dried at a temperature condition of 60° C.

$$\text{Ink drying rate } [\%] = (W_{BEFORE} - W_{AFTER})/W_{BEFORE} \times 100 \quad \text{Formula (A):}$$

However, in Formula (A), "$W_{BEFORE}$" represents the mass of the ink before drying (initial mass); "$W_{AFTER}$" represents the mass of the ink after drying. Ink drying is specifically performed by dropping approximately 100 mL of ink onto a glass substrate, weighing it to obtain the mass of the ink before drying, and then heating it to 60° C. on a hot plate capable of measuring mass.

To obtain the viscosity at an ink drying rate of 20%, the above drying should be stopped when the mass reaches 80% of the initial mass (mass before drying), and the viscosity should be measured using the resulting ink after drying.

With respect to (1-1) above, it is preferable that the ink of the present invention has a viscosity of 10 mPa·s or less at a shear rate of 1000 (1/s). Although the lower limit of the viscosity at a shear rate of 1000 (1/s) is not particularly limited, from the viewpoint of inkjet ejection performance, it is preferable that the viscosity is around 5 mPa·s.

With respect to (1-2) above, it is preferable that the ink of the present invention has a viscosity of 300 mPa·s or more at a shear rate of 1 (1/s) at an ink drying rate of 20%.

When the viscosity at a shear rate of 1 (1/s) is at least 150 mPa·s, it is possible to suppress the occurrence of color mixing when the ink lands on the substrate. The viscosity of ink increases as the ink drying rate increases. With the ink of the present invention, by setting the ink drying rate to 20% at the highest, the viscosity at a shear rate of 1 (1/s) may achieve 150 mPa·s. As a result, when the ink lands on the substrate, it is possible to suppress the occurrence of color mixing without excessively heating the ink.

Furthermore, it is preferable that the ink of the present invention satisfy the following condition (1-3) in relation to (1-2) above.

(1-3) The viscosity (25° C.) at a shear rate of 1 (1/s) is 25 mPa·s or more.

As mentioned above, the viscosity of ink increases as the ink drying rate increases. Therefore, the viscosity of ink at shear rate 1 (1/s) is considered to have a certain degree of correlation with the state of no drying at all and ink drying rate of 20%. In relation to (1-3) above, it is preferable that the viscosity of the ink of the present invention at a shear rate of 1 (1/s) is 45 mPa·s or more, and even more preferably 100 mPa·s or more.

The inkjet ink of the present invention further preferably satisfies at least one of the following conditions (1-4), (1-5) and (1-6), more preferably two or more conditions. It is more preferable to satisfy all of these conditions.

(1-4) At an ink drying rate of 20%, the loss tangent (tan δ) at 1% distortion is less than 1 when the distortion is varied under the conditions of a temperature of 25° C., an angular frequency ω of 10 rad/s, and a swing angle γ of 1 to 1000%.

(1-5) At an ink drying rate of 20%, the crossover distortion of the storage elastic modulus and the loss elastic modulus is 20% or more when the distortion is changed under the conditions of a temperature of 25° C., an angular frequency ω of 10 rad/s, and a swing angle of γ of 1 to 1000% or more.

(1-6) The thixotropy index represented by n in the viscosity equation of the following Equation (2) is 0.85 or less.

$$\eta a = \mu D^{n-1} \quad \text{Equation (2):}$$

In Equation (2), ηa represents an apparent viscosity: D represents a shear rate; μ represents a non-Newtonian viscosity coefficient.

The loss tangent (tan δ) in (1-4), and the storage elastic modulus and loss elastic modulus in (1-5) may be measured by a rheometer (viscoelasticity measuring device). MCR-102 manufactured by Anton Paar Corporation is an example of a rheometer. In the present specification, the loss tangent may be referred to simply as "tan δ".

In the present specification, tan δ, storage elastic modulus, and loss elastic modulus are determined using a rheometer. Specifically, MCR-102 manufactured by Anton Paar Corporation is used in oscillation mode. The measurement may be performed under the following conditions of a temperature of 25° C., an angular frequency ω of 10 rad/s, and a swing angle γ of 1 to 1000%. During the measurement, the sample is distorted by changing the swing angle γ of the rheometer's cone plate. Here, since the measurement sample is distorted following the swing angle γ, the swing angle γ of the cone plate and the distortion of the measurement sample are the same value.

In (1-4), tan δ at 1% distortion is used as an index in the above measurement. When the tan δ at 1% distortion is less than 1 under the measurement conditions, the ink has more elastic properties, and when compared with similar viscosities, the ink has better pinning properties and image quality is improved. In (1-4), the tan δ at 1% distortion is more preferably 0.8 or less, and further preferably 0.6 or less.

In (1-5), the crossover distortion between the storage elastic modulus and loss elastic modulus when the distortion is changed is used as an index in the above measurement. The crossover distortion is specifically indicated as the distortion value (%) at the intersection of the graphs of the logarithmic graph showing the storage elastic modulus (Pa) on the vertical-axis and the distortion (%) on the horizontal-axis, respectively, and the logarithmic graph showing the loss elastic modulus (Pa) on the vertical-axis and the distortion (%) on the horizontal-axis, respectively. When the crossover distortion (%) is 20% or higher under the measurement conditions, the ink has more elastic properties and the image quality is improved in the same way as described above. A crossover distortion of 30% or more is more preferable, and 40% or more is even more preferable.

In (1-6), the viscosity equation expressed in Equation (2): $\eta a = \mu D^{n-1}$ is an equation that shows the relationship between an apparent viscosity ηa (mPa·s) and shear rate D (1/s). The relationship between an apparent viscosity ηa (mPa·s) and shear rate D (1/s) in the viscosity equation may be measured using a rheometer, for example, MCR-102 manufactured by Anton Paar Corporation.

Specifically, in the rotation mode of the MCR102, with temperature: 25° C., setting time: 150 measurement points, measurement interval: 2 s, shear rate: 1000 (1/s) to 1 (1/s), the apparent viscosity ηa (mPa·s) is measured. A logarithmic graph showing the apparent viscosity ηa (mPa·s) on the vertical axis (Y-axis) and the shear rate (1/s) on the horizontal axis (X-axis) is made. The thixotropy index n is obtained from the slope (n−1) of the graph. The intercept of the graph is the non-Newtonian viscosity coefficient μ.

Here, n is obtained from the viscosity equation: $\eta a = \mu D^{n-1}$ as follows.

$$\log \eta a = \log(\mu D^{(n-1)})$$

$$= \log \mu + \log(D^{(n-1)})$$

$$= \log \mu + (n-1) \times \log D$$

Plotting log ηa on the Y-axis and log D on the X-axis, a graph of Y=(n−1) X+log μ is obtained, and n is calculated from the slope (n−1).

In (1-6), when the thixotropic index is 0.85 or less, the viscosity during head circulation may be lowered and the thickening speed at the time of landing may be increased and the image quality improves. It is possible to prevent color mixing at high printing speeds.

<Composition of Inkjet Ink>

The ink of the present invention contains an aqueous solvent, a pigment and a thixotropy-imparting agent, and satisfies (1-1) and (1-2) above. The ink of the present invention further preferably satisfies one or more of (1-3) through (1-6) above.

The ink of the present invention preferably has a solid content of 6 to 30 mass %. The solid content of the ink refers to components that cannot be removed by drying at 100° C. The solid content of the ink is, for example, the component other than solvents including aqueous solvents. In addition to the aqueous solvent, the pigment, and the thixotropy-imparting agent, the ink may contain optional components that do not impair the effects of the invention. Examples of optional components include a pigment dispersant, a fixing resin, and a surfactant. Each component in the ink of the present invention is described below.

(Thixotropy-Imparting Agent)

The thixotropy-imparting agent is not restricted as long as the material may impart thixotropy to the ink that satisfies the above conditions of (1-1) and (1-2). The thixotropy-imparting agent is preferably in particle form (however, particle form includes fiber form), and an aspect ratio of 20 or more is more preferred.

When the thixotropy-imparting agent is in particle form, preferred shape forms are elliptical, scaly, plate, needle, and fibrous forms. The aspect ratio, which indicates the ratio of the long diameter to the short diameter of the thixotropy-imparting agent, is preferably 20 or more. When the aspect ratio is 20 or more, it is easier to impart thixotropy to the ink. The long diameter of the thixotropy-imparting agent is preferably 2 μm or less. When the long diameter of the thixotropy-imparting agent exceeds 2 pum, the inkjet ejection performance may be affected.

In the present specification, the cross-section for measuring the aspect ratio of the thixotropic agent is the cross-section parallel to the longitudinal direction of the particles, and cut in the direction of thickness. The aspect ratio is the value obtained from the average long diameter and average short diameter of 50 particles each obtained from the cross-section. When the particle shape is scale or plate, the short diameter is the thickness of the particle, and the long diameter is the length of the long side of the cross section where the aspect ratio of the particle is measured, or the length or maximum diameter of the long side when the particle is viewed in a plane. When the particle shape is needle-like or fibrous, the major diameter is the length of the particle, and the minor diameter is the major axis of the cross section orthogonal to the length direction of the particle, or the maximum width when the particle is viewed in a plane.

Examples of the material of the thixotropy-imparting agent include polysaccharides and inorganic particles. Examples of the polysaccharide include cellulose, chitin, chitosan, xanthan gum, welan gum, succinoglycan, guar gum, locust bean gum and its derivatives, glucomannan, agar, and carrageenan. Examples of the derivative include methyl cellulose, hydroxyethyl cellulose, and carboxymethyl cellulose as the derivative of cellulose.

As a polysaccharide, natural polysaccharides with a weight average molecular weight of several million are preferred. Specifically, xanthan gum, guar gum, and carrageenan are preferred.

Polysaccharide nanofibers are preferably used as a thixotropy-imparting agent in the ink of the present invention. The polysaccharide nanofibers are produced as follows. Aggregates of polysaccharides such as shells of crustaceans such as trees, crabs, and shrimp are finely divided and refined by conventionally known methods such as oxidation treatment using a catalyst and mechanical treatment using a grinder. The polysaccharide in polysaccharide nanofibers is preferably at least one of cellulose, chitin, and chitosan, with cellulose being more preferred.

In the present specification, nanofibers are defined as those with a width of 1 to 100 nm and an aspect ratio of 100 or more. The length and width of nanofibers may be measured, for example, using an electron microscope. The width of the nanofibers may be measured, for example, as the width in a plan view or as the diameter of a cross section perpendicular to the length direction of the nanofibers. In either case, the "width" of the nanofiber is the average of the maximum width in each nanofiber in 50 nanofibers. The "length" of the nanofiber is the average length of the 50 nanofibers. The aspect ratio of the nanofiber is determined as the length divided by the width.

When nanofibers of polysaccharides are used as a thixotropy-imparting agent in the ink of the present invention, smaller sized nanofibers are preferred. The width of the nanofibers is preferably 1 to 50 nm, more preferably 1 to 5 nm. The length of the nanofibers is preferably 0.5 to 2 μm, more preferably 0.5 to 1 μm. But it is not limited to this. The aspect ratio of the nanofibers is preferably in the range of 100 to 400, and more preferably in the range of 100 to 300.

In polysaccharide aggregates, polysaccharides such as cellulose, chitin, and chitosan exist as structural units called microfibrils that are bound to each other. These microfibrils are 3 to 4 nm wide and several μm long (e.g., 2 to 5 μm), but it is difficult to untangle them one by one. When polysaccharide aggregates are mechanically crushed, many conventional methods result in nanofibers with a width of 20 to 50 nm. In the present invention, such nanofibers of polysaccharides may be used as nanofibers of polysaccharides. It is more preferable to use TEMPO-oxidized nanofibers which are more finely dissolved by TEMPO oxidation, for example, in microfibril units.

TEMPO oxidation is an oxidation reaction which uses 2,2,6,6-tetramethyl-1-piperidine-oxyl radical (TEMPO) as a catalyst. By oxidizing polysaccharide aggregates in the presence of TEMPO, nanofibers having a width of 3 to 4 nm and a length of several μm (e.g., 2 to 5 μm) corresponding to microfibrils may be obtained.

Cellulose nanofibers used as a thixotropy-imparting agent are nanofibers of cellulose. The form of nanofibered cellulose includes, for example, powdered cellulose and microcrystalline cellulose.

Cellulose nanofibers include Rheocrysta (registered trademark) manufactured by Dai-ichi Kogyo Seiyaku, TEMPO oxidized cellulose nanofibers manufactured by Nippon Paper Industries, Ltd. Cellenpia TC-01A, Cellenpia TC-02X ("Cellenpia" is a registered trademark) manufactured by Nippon Paper Industries Co., IMa-10002, BMa-10002, WMa-1 0002, AMa-10002, and FMa-10002 manufactured by Sugino Machine Co., ELEX-☆ and ELEX-S manufactured by Daio Paper Company, and AUROVISCO manufactured by Oji Paper Co., Ltd.

As inorganic particles, they are not limited as long as the particles having a material and shape that may impart thixotropy satisfying the above conditions (1-1) and (1-2) to the ink. Particles of various natural or synthetic clay minerals are preferred.

Smectite clay minerals are preferred as clay minerals. Smectite clay minerals are classified as phyllosilicates of layered silicate minerals or bentonite stone group minerals. Smectite clay minerals are classified into the montmorillonite subgroup and the saponite subgroup according to their stacking structure. The montmorillonite subgroup includes montmorillonite, nontronite or beidellite. The saponite subgroup includes hectorite, saponite or sauconite.

Smectite clay minerals may be natural or synthetic. Smectite clay minerals are layered materials with stacked platelets, and when used as thixotropic agents, they are usually used as delaminated platelet particles. When smectite clay minerals are synthetic, they have smaller aspect ratios and lower impurity content than natural products.

The plate-like particles of smectite clay mineral preferably have preferably have a thickness in the range of 0.2 to 3.0 nm and a length in the range of 10 to 150 nm. The plate-like particles more preferably have a thickness in the range of 0.2 to 2.0 nm and a length in the range of 10 to 125 nm. The aspect ratio is a value obtained by dividing the length of the plate-like particles by the thickness, and is preferably 20 or more. The aspect ratio is more preferably in the range of 20 to 200.

The length and thickness of the plate-like particles may be measured, for example, using an electron microscope. The thickness of a platelet particle is, for example, the average of 50 thicknesses of platelet particles measured in a given cross-section. The "length" of a platelet is the average of 50 lengths measured as the largest diameter when the platelet is viewed in a plain view. The aspect ratio of the plate-like particles is obtained as the value obtained by dividing the length by the thickness.

For example, a synthetic layered silicate, Laponite (BYK Chemie), may be used as a smectite clay mineral. Laponite is a synthetic low-charge clay whose structure and chemical composition is similar to hectorite, a natural smectite clay mineral. The main particles of Laponite are in the form of disks with a maximum diameter of 30 nm and a thickness of 1 nm.

Commercial products may be used as a smectite clay mineral. Examples of the commercial product include Laponite RD (manufactured by BYK Chemie), Kunipia F and Kunipia G, which are purified bentonites manufactured by Kunimine Industries, Co., Inc.

Alumina nanofibers (short diameter of 4 nm and long diameter of 1400 nm) made by Kawaken Fine Chemicals Co., Ltd. may be used as inorganic particles.

From the viewpoint of imparting the characteristics of (1-1) and (1-2) to the ink, the content of the thixotropy-imparting agent in the ink of the present invention is preferably in the range of 0.01 to 1 mass % of the total amount of the ink, more preferably it is in the range of 0.08 to 0.5 mass %.

In the inks of the present invention, one thixotropy-imparting agent may be used alone or in combination of two or more materials. In the ink of the present invention, it is preferable that the thixotropy-imparting agent comprises two or more materials. Furthermore, one of the two or more materials is preferably a smectite clay mineral. Preferred combinations of thixotropy-imparting agent include combinations of cellulose nanofibers and smectite clay minerals and combinations of xanthan gum and smectite clay minerals. The combination of cellulose nanofibers and smectite clay minerals is particularly preferred.

It is believed that cellulose nanofibers and smectite clay minerals, even when each is used alone, may impart elastic properties to the ink by forming a specific gel structure, for example, at an ink drying rate of 20%. Thereby, the ink containing cellulose nanofibers or smectite clay minerals may achieve (1-1) and (1-2) above. In addition to being able to achieve (1-1) and (1-2) above, (1-4) and (1-5) above may be easily achieved. The combination of cellulose nanofibers and smectite clay minerals is also preferred because the above elastic properties are enhanced.

The ratio of smectite clay minerals to other thixotropic agents may be selected according to ink viscosity and thixotropy. The ratio may be adjusted in the range of 10:1 to 1:10. The combination of the two improves the thixotropy of the ink to a greater extent than the addition of each of the above alone, resulting in better image quality. The reason for the improved thixotropy is presumed to be that smectite clay minerals have an electric charge, and the smectite clay minerals and other thixotropic agents electrically aggregate to form a structure.

(Pigment)

Conventional organic and inorganic pigments known to the public may be used as a pigment contained in the ink of the present invention. Examples thereof include azo pigments such as azo rakes, insoluble azo pigments, condensed azo pigments, chelated azo pigments, and polycyclic pigments such as phthalocyanine pigments, perylene and perylene pigments, anthraquinone pigments, quinacridone pigments, dioxandine pigments, thioindigo pigments, isoindolinone pigments, quinophthaloni pigments, and dye rakes such as basic dye-type rakes and acid dye-type rakes, organic pigments such as nitro pigments, nitroso pigments, aniline black, daylight fluorescent pigments, and inorganic pigments such as carbon black.

Specific organic pigments that may be preferably used include the following pigments.

Examples of the pigment for magenta or red include C.I. Pigment Red 2, C.I. Pigment Red 3, C.I. Pigment Red 5, C.I. Pigment Red 6, and C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 202, C.I. Pigment Red 222, and C.I. Pigment Violet 19.

Examples of the pigment for orange or yellow include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C. I. Pigment Yellow 15:3, C.I. Pigment Yellow 17, C.I. Pigment Yellow 74, C.I. Pigment Yellow 93, C.I. Pigment Yellow 128, C.I. Pigment Yellow 94, C.I. Pigment Yellow 138, and C.I. Pigment Yellow 155. Pigment Yellow 155 is particularly preferred for its balance of color tone and lightfastness.

Examples of the pigment for green or cyan include C.I. Pigment Blue 15, C.I. Pigment Blue 15:2, C.I. Pigment Blue 15:3, C.I. Pigment Blue 16, C.I. Pigment Blue 60, and C.I. Pigment Green 7.

Examples of the pigment for black include C.I. Pigment Black 1, C.I. Pigment Black 6, C.I. and C.I. Pigment Black 7.

The pigment content in the ink is not particularly limited, but a content in the range of 7 to 18 mass % is preferred for inorganic pigments, and a content in the range of 0.5 to 7 mass % is preferred for organic pigments.

(Pigment Dispersant)

The ink of the present invention optionally contains a pigment dispersant to disperse the pigment. Although not particularly limited, a polymeric dispersant with an anionic group is preferred as a pigment dispersant, and those with a number average molecular weight in the range of 5,000 to 200,000 may be suitably used.

Examples of the pigment dispersant include block copolymers, random copolymers and their salts derived from two or more monomers selected from styrene, styrene derivatives, vinylnaphthalene derivatives, acrylic acid, acrylic acid derivatives, maleic acid, maleic acid derivatives, itaconic acid, itaconic acid derivatives, fumaric acid, and fumaric acid derivatives, polyoxyalkylene, and polyoxyalkylene alkyl ethers.

The pigment dispersant preferably has an acryloyl group and an acidic group. The acidic group is preferably neutralized with a neutralizing base before adding. The neutralizing base is not limited, but organic bases such as ammonia, monoethanolamine, diethanolamine, triethanolamine, and morpholine are preferred.

The added amount of the pigment dispersant is preferably in the range of 10 to 100 mass % of the pigment, and more preferably in the range of 10 to 40 mass %.

It is particularly preferable for the pigment to be in the form of so-called capsule pigment, in which the pigment is coated with the pigment dispersant described above. Various known methods may be used to coat pigments with pigment dispersants. For example, the inverted phase emulsification method, the acid deposition method, or the method in which pigments are dispersed by a polymerizable surfactant and monomers are supplied thereto and covered while polymerizing are preferably exemplified.

A particularly preferred method is to dissolve the pigment dispersant in an organic solvent such as methyl ethyl ketone, partially or completely neutralize the acidic groups in the resin with a base, add the pigment and ion-exchanged water, disperse, remove the organic solvent, and add water as necessary.

The average particle size of the dispersed state of the pigment in the ink is preferably 50 nm or more and less than 200 nm. This will improve the dispersion stability of the pigments and the storage stability of the ink. The particle diameter of the pigment may be measured using commercially available particle size analyzers that use dynamic light scattering, electrophoresis, or other methods, but the dynamic light scattering method is simpler and more accurate in measuring the particle diameter region.

The pigments may be dispersed in a disperser together with a pigment dispersant and other additives as required for various desired purposes.

Examples of the disperser that may be used are a conventional ball mill, a sand mill, a line mill, and a high-pressure homogenizer. Among these, dispersing a pigment by a sand mill is preferred because the particle size distribution is sharper. The material of beads used for sand mill dispersion is not particularly limited, but zirconia or zircon is preferred from the viewpoint of preventing the formation of bead debris and contamination of ionic components. Furthermore, the bead diameter is preferably in the range of 0.3 to 3 mm.

(Aqueous Solvent)

The ink of the present invention contains an aqueous solvent. The aqueous solvent contains water as an essential solvent and optionally includes known aqueous solvents, preferably for viscosity adjustment and other purposes.

The water contained in the ink according to the present invention is not limited, and it may be ion-exchanged water, distilled water, or pure water.

Examples of the aqueous solvent contained in the ink include alcohols, polyhydric alcohols, amines, amides, glycol ethers, 1,2-alkanediols having 4 or more carbon atoms.

Examples of the alcohol include methanol, ethanol, 1-propanol, 2-propanol, 1-butanol, 2-butanol, 2-methyl-1-propanol, t-butanol, 3-methoxy-1-butanol, 3-methoxy-3-methylbutanol, 1-Octanol, 2-octanol, n-nonyl alcohol, tridecyl alcohol, n-undecyl alcohol, stearyl alcohol, oleyl alcohol, and benzyl alcohol.

Examples of the polyhydric alcohol include ethylene glycol, diethylene glycol, triethylene glycol, tetraethylene glycol, polyethylene glycol with 5 or more ethylene oxide groups, propylene glycol, dipropylene glycol, tripropylene glycol, polypropylene glycol with 4 or more propylene oxide groups, butylene glycol, hexanediol, pentanediol, glycerin, hexantriol, and thiodiglycol.

Examples of the amine include ethanolamine, diethanolamine, triethanolamine, N-methyldiethanolamine, N-ethyldiethanolamine, morpholine N-ethylmorpholine, ethylenediamine, diethylenediamine, triethylenetetramine, tetraethylenepentamine, polyethyleneimine, pentamethyldiethylenetriamine, and tetramethylpropylenediamine.

Examples of the amide include formamide, N,N-dimethylformamide, and N,N-dimethylacetamide.

Examples of the glycol ether include ethylene glycol monoethyl ether, ethylene glycol monobutyl ether, diethylene glycol monoethyl ether, diethylene glycol monobutyl ether, triethylene glycol monobutyl ether, propylene glycol monopropyl ether, dipropylene glycol monomethyl ether, and tripropylene glycol monomethyl ether.

Examples of the 1,2-alkanediol having 4 or more carbon atoms include 1,2-butanediol, 1,2-pentanediol, 1,2-hexanediol, and 1,2-heptanediol.

Particularly preferred aqueous solvents are polyhydric alcohols, which may suitably suppress bleeding during high-speed printing. Specifically preferred are ethylene glycol, diethylene glycol, triethylene glycol, tetraethylene glycol, propylene glycol, dipropylene glycol, and tripropylene glycol.

The ink may contain one or a combination of two or more selected from these aqueous solvents.

The amount of water in the ink of the present invention is preferably in the range of 20 to 80 mass % of the total mass of the ink, and more preferably in the range of 40 to 70 mass %. The content of the aqueous solvent in the ink is preferably an amount in the range of 5 to 60 mass % of the total mass of the ink. In particular, when the ink is dried at high speed during image formation, it is more preferable that the content of aqueous solvent in the ink is in the range of 5 to 30 mass %. In the ink of the present invention, it is preferable that practically only aqueous solvents are contained as solvents, i.e., no non-aqueous solvents are contained. For example, when the total solid content in the ink is 6 to 30 mass % in the above, the content of aqueous solvents, as the total content of water and aqueous solvents, is preferably 70 to 94 mass %. Or, if necessary, the content of aqueous solvent in the ink is preferably in the range of 50 to 90 mass % as the total content of water and aqueous solvent.

(Fixing Resin)

The ink of the present invention optionally contains a fixing resin. The fixing resin functions as a binder for the pigment, which is the coloring agent, to improve the adhesion of the coating film to the substrate, especially non-absorbent substrate, and to improve the abrasion resistance of the coating film obtained with the ink. The fixing resin is preferably a water-insoluble resin. The water-insoluble resin as a fixing resin is preferably used in the form of fine particles dispersed in an aqueous solvent.

Water-insoluble resin particles are essentially water-insoluble resin dispersed as microscopic particles in an aqueous solvent. The microparticles may, for example, be dispersed in an aqueous solvent as microparticles by forced emulsification of the water-insoluble resin using an emulsifier. Alternatively, a hydrophilic functional group may be introduced into the molecule of the water-insoluble resin to form stable microparticles by itself in an aqueous solvent without the use of an emulsifier or dispersion stabilizer, in other words, self-emulsification. The aqueous solvent in which the fine particles of water-insoluble resin are dispersed may be the same aqueous solvent as described above, usually water or a water/alcohol mixed solvent. Hereafter, the fine particles of water-insoluble resin dispersed in an aqueous solvent are also referred to as aqueous dispersion.

In the present invention, a "water-insoluble resin" means that when the resin is dried at 105° C. for 2 hours, and then dissolves in 100 g of water at 25° C., it refers to a resin which dissolves 10 g or less, preferably 5 g or less, and further preferably 1 g or less. However, when the resin has a salt-forming group, the dissolved amount is the dissolved amount when the salt-forming group of the resin is 100% neutralized with acetic acid or sodium hydroxide, depending on the type.

As the fixing resin according to the present invention, a polyester resin, a polyurethane resin, and a polyacrylic resin which are water-insoluble resins are preferable. One of these resins may be used alone or in combination with two or more of them as a fixing resin in the present invention.

It is preferable that the fixing resin is contained in the range of 3 to 10 mass % with respect to the total mass of the ink (100 mass %), and it is more preferred that it is contained in the range of 4 to 7 mass %, from the viewpoint of not impairing the effect of the invention and to enhance the fixability of the coating film to the substrate.

(Polyester Resin)

Polyester resins used as a fixing resin may be obtained using polyhydric alcohol components and polyvalent carboxylic acid components such as polyvalent carboxylic acid, polyvalent carboxylic anhydride, and polyvalent carboxylic acid ester.

Examples of the polyhydric alcohol component include divalent alcohols (diols). Specific examples include alkylene glycols having 2 to 36 carbon atoms (ethylene glycol, 1,2-propylene glycol, 1,3-propylene glycol, 1,4 butylene glycol, and 1,6-hexanediol), alkylene ether glycols having 4 to 36 carbon atoms (diethylene glycol, triethylene glycol, dipropylene glycol, polyethylene glycol, polypropylene glycol, and polybutylene glycol), alicyclic diols having 6 to 36 carbon atoms (1,4-cyclohexanedimethanol and hydrogenated bisphenol A), alkylene oxides adducts having 2 to 4 carbon atoms of the alicyclic diols (ethylene oxide (hereinafter referred to as EO), propylene oxide (hereinafter abbreviated as PO), butylene oxide (hereinafter abbreviated as BO) adducts having addition mole number of 1 to 30), alkylene oxide adducts having 2 to 4 carbon atoms (EO, PO, BO) of bisphenols (bisphenol A, bisphenol F, bisphenol S) (having addition mole number of 1 to 30). These may be used alone or in combination of two or more.

Examples of the polyvalent carboxylic acid component include a divalent carboxylic acid (dicarboxylic acid), specifically alkanedicarboxylic acids having 4 to 36 carbon atoms (succinic acid, adipic acid, sebacic acid), alkenyl succinic acids (dodecenyl succinic acid), alicyclic dicarboxylic acids having 4 to 36 carbon atoms (dimeric acid (dimerized linoleic acid)), alkenedicarboxylic acids having 4 to 36 carbon atoms (maleic acid, fumaric acid, citraconic acid, mesaconic acid), and aromatic dicarboxylic acids having 8 to 36 carbon atoms (phthalic acid, isophthalic acid, terephthalic acid or their derivatives, naphthalene dicarboxylic acid). These may be used alone or in combination of two or more.

The number average molecular weight (Mn) of the aforementioned polyester resins is preferably in the range of 1,000 to 50,000, and more preferably in the range of 2,000 to 20,000.

Commercially available products may be used as the above polyester resins. As commercially available products, for example, dispersions in which the above polyester resins are dispersed in an aqueous solvent as an aqueous dispersion may be used. The following are examples of commercially available dispersions. In the examples, the parentheses indicate the number average molecular weight of the polyester resin contained in the products (dispersions). These may be used singly or in combination of two or more kinds.

The following are all trade names: Elitel KA-5034 (manufactured by Unitika Ltd., number average molecular weight: 8500), Elitel KA-5071S (manufactured by Unitika Ltd., number average molecular weight: 8500), Elitel KA-1449 (manufactured by Unitika Ltd., number average molecular weight: 7000), Elitel KA-0134 (manufactured by Unitika Ltd., number average molecular weight: 8500), Elitel KA-3556 (manufactured by Unitika Ltd., number average molecular weight: 8000), Elitel KA-6137 (manufactured by Unitika Ltd., number average molecular weight: 5000), Elitel KZA-6034 (manufactured by Unitika Ltd., number average molecular weight: 6500), Elitel KT-8803 (manufactured by Unitika Ltd., number average molecular weight: 15,000), Elitel KT-8701 (manufactured by Unitika Ltd., number average molecular weight: 13000), Elitel KT-9204 (manufactured by Unitika Ltd., number average molecular weight: 17000), Elitel KT-8904 (manufactured by Unitika Ltd., number average molecular weight: 17000), Elitel KT-0507 (manufactured by Unitika Ltd., number average molecular weight: 17,000), Elitel KT-9511 (manufactured by Unitika Ltd., number average molecular weight: 17000), and Vylonal MD-2000 (manufactured by Toyobo Co., Ltd.; number average molecular weight: 18000).

(Polyurethane Resin)

As a polyurethane resin used as a fixing resin, those having a hydrophilic group may be used. Examples of the hydrophilic group include a carboxy group (—COOH) and its salt, a sulfonic acid group (—SO$_3$H) and its salt. Examples of the above salt include alkali metal salts such as sodium salt and potassium salt, and amine salts. Among the above hydrophilic groups, a carboxy group or salts thereof are preferred.

The above polyurethane resin is preferably an aqueous dispersion of self-emulsifying polyurethane having a water-soluble functional group in its molecules dispersed in an aqueous solvent, or an aqueous dispersion of forced emulsifying polyurethane emulsified under strong mechanical shear force in combination with a surfactant. The polyurethane resin in the above water dispersion may be obtained by reaction of a polyol with an organic polyisocyanate and a hydrophilic group-containing compound.

Examples of the polyol that may be used in the preparation of an aqueous dispersion of the above polyurethane resin include a polyester polyol, a polyether polyol, a polycarbonate polyol, and a polyolefin polyol.

Examples of the polyester polyol include condensed product of low molecular weight polyol such as ethylene glycol, diethylene glycol, triethylene glycol, 1,2- and 1,3 propylene glycol, neopentyl glycol, 1,3- and 1,4-butanediol, 1,4-butanediol, 3-methylpentanediol, hexamethylene glycol, 1,8-octanediol, 2-methyl-1,3-propanediol, bisphenol A, hydrogenated bisphenol A, trimethylolpropane, and cyclohexanedimethanol, with polyvalent carboxylic acids such as succinic acid, glutaric acid, adipic acid, sebacic acid, phthalic acid, isophthalic acid, terephthalic acid, trimellitic acid, tetrahydrofuranic acid, endomethyltetrahydrofuranic acid and hexahydrophthalic acid.

Examples of the polyether polyol include polyethylene glycol, polypropylene glycol, polyethylene polytetramethylene glycol, polypropylene polytetramethylene glycol, and polytetramethylene glycol.

Examples of the polycarbonate polyol include compounds obtained by the reaction of carbonic acid derivatives such as diphenyl carbonate, dimethyl carbonate or phosgene with diols. Examples of the above diol include ethylene glycol, diethylene glycol, triethylene glycol, 1,2- and 1,3-propylene glycol, neopentyl glycol, 1,3- and 1,4-butanediol, 3-methylpentanediol, hexamethylene glycol, 1,8-octanediol, 2-methyl-1,3-propanediol, bisphenol A, hydrogenated bisphenol A, trimethylolpropane, and cyclohexanedimethanol.

Examples of the organic polyisocyanate that may be used in the preparation of an aqueous dispersion of a polyurethane resin include aromatic isocyanates such as tolylene diisocyanate (TDI), diphenylmethane diisocyanate (MDI), polypeptide MDI, xylylene diisocyanate (XDI), tetramethylxylylene diisocyanate (TMXDI); aliphatic isocyanates such as hexamethylene diisocyanate (HMDI); and alicyclic isocyanates such as sophorone diisocyanate (IPDI) and 4,4'-dicyclohexylmethane diisocyanate (hydrogenated MDI, H12MDI). Only one of these types may be used alone, or two or more may be used in combination.

Examples of the hydrophilic group-containing compound that may be used in the preparation of an aqueous dispersion of a polyurethane resin include carboxylic acid-containing compounds such as 2,2-dimethylol propionic acid, 2,2-dimethylol butyric acid, 2,2-dimethylol lactic acid, 2,2-dimethylol valeric acid, and glycine and their derivatives such as sodium, potassium, and amine salts; sulfonic acid-containing compounds such as taurine (i.e., aminoethyl sulfonic acid) and ethoxypolyethylene glycol sulfonic acid and their derivatives such as sodium, potassium, and amine salts.

The polyurethane resins may be obtained by known methods. For example, the aforementioned polyol, organic polyisocyanate, and hydrophilic group-containing compound are mixed, and the mixture is heated at a temperature in the range of 30 to 130° C. for 30 minutes to 50 hours to obtain a urethane polymer.

The above urethane polymer is polymerized by elongation with a chain extender to become a polyurethane resin with a hydrophilic group. Water and/or amine compounds are preferred as chain extenders. By using water or an amine compound as a chain extender, the isocyanate-terminated prepolymer may be efficiently elongated by reacting with free isocyanate in a short time.

Examples of the amine compound as a chain extender include aliphatic polyamines such as ethylenediamine and triethylenediamine; aromatic polyamines such as meta-xylenediamine and toluylenediamine; polyhydrazino compounds such as hydrazine and adipic acid dihydrazide. The above amine compounds may contain, along with the above polyamines, monovalent amines such as dibutylamine and methyl ethyl ketoxime as a reaction stopper to the extent that polymerization is not significantly inhibited.

In the synthesis of urethane prepolymers, solvents that are inert to isocyanates and may dissolve the urethane prepolymers may be used. Examples of these solvents include dioxane, methyl ethyl ketone, dimethyl formamide, tetrahydrofuran, N-methyl-2-pyrrolidone, toluene, and propylene glycol monomethyl ether acetate. These hydrophilic organic solvents used in the reaction stage are preferably removed at the end.

Further, in the synthesis of urethane prepolymer, in order to promote the reaction, an amine catalyst (for example, triethylamine, N-ethylmorpholin, triethyldiamine,), tin catalysts (for example, dibutyltin dilaurate, dioctyltin dilaurate, tin octylate), and titanium catalysts (for example, tetrabutyl titanate) may be added.

The number average molecular weight of the urethane resin is preferably made as large as possible by introducing a branched or internally cross-linked structure, and the number average molecular weight is preferably in the range of 50,000 to 10,000,000. This is because by keeping the molecular weight within the above range, the urethane resin is less soluble in solvents, resulting in a coating film with excellent weather resistance and water resistance. In the present specification, the number average molecular weight (Mn) is a value measured by gel permeation chromatography (GPC). For example, using a device "RID-6A" manufactured by Shimadzu Corporation (column: "TSK-GEL" manufactured by Tosoh Corporation, solvent: tetrahydrofuran (THF), column temperature: 40° C.), the number average molecular weight (Mn) may be obtained from the calibration curve prepared with polystyrene standard samples.

Commercially available products may be used for the above polyurethane resins. As a commercial product, for example, a dispersion in which the above polyurethane resin is dispersed in an aqueous solvent as a water dispersion may be used.

Examples of the commercially available dispersion of the above polyurethane resins include WBR-016U (manufactured by Taisei Fine Chemical Corporation), Superflex 620, Superflex 650, Superflex 500M, Superflex E-200 (manufactured by Dai-ichi Kogyo Seiyaku Co., Ltd, "Superflex" is a registered trademark), Permalyn UC-20 (manufactured by Sanyo Chemical Co. Ltd., "Permalyn" is a registered trademark), Parasurf UP-22 (manufactured by Ohara Paragium Chemical Co., Ltd.), Evafanol HA-560 (manufactured by Nicca Chemical Co., Ltd.).

[Polyacrylic Resin]

Polyacrylic resins used as a fixing resin include (co) polymers of (meth)acrylic acid ester components, or copolymers of (meth)acrylic acid ester components and polymerizable components other than (meth)acrylic acid ester components such as styrene components. In the present specification, (meth)acrylic acid is a generic term for acrylic acid and methacrylic acid.

Examples of the (meth)acrylic ester component include methyl (meth)acrylate, ethyl (meth)acrylate, propyl (meth)acrylate, butyl (meth)acrylate, 2-hydroxyethyl (meth)acrylate, 2-hydroxypropyl (meth)acrylate, 4-hydroxybutyl (meth)acrylate, cyclohexyl (meth)acrylate, tetrahydrofurfuryl (meth)acrylate, isobornyl (meth)acrylate, benzyl (meth)acrylate, 2-hydroxybutyl (meth)acrylate, benzyl (meth)acrylate, glycidyl (meth)acrylate, (meth)acrylic acid, (di) ethylene glycol di(meth)acrylate, 1,4-butanediol di(meth)acrylate, 1,6-hexanediol di(meth)acrylate, trimethylolpropane tri(meth)acrylate, glycerin di(meth)acrylate, 2-ethylhexyl (meth acrylate, lauryl (meth)acrylate, stearyl (meth)acrylate, and acrylamide.

Examples of the styrene component include styrene, 4-methylstyrene, 4-hydroxystyrene, 4-acetoxystyrene, and 4-acetylstyrene and styrenesulfonic acid. Only one of these components may be used alone, or two or more may be used in combination of two or more.

The number average molecular weight (Mn) of the above polyacrylic resin is preferably in the range of 1,000 to 50,000, more preferably in the range of 2,000 to 20,000. When the number average molecular weight (Mn) of the above polyacrylic resin is 1,000 or higher, the cohesive strength of the coating film becomes stronger and adhesion improves. When it is below 50,000, the solubility in organic solvents is good and the particle size of the emulsion dispersion is reduced to a smaller size.

Commercially available products may be used as the above polyacrylic resin. For example, a dispersion in which the above polyacrylic resin is dispersed in an aqueous solvent as a water dispersion may be used as a commercially available product.

Examples of the commercially available polyacrylic resin dispersion include Delpet 60N and 80N (manufactured by Asahi Kasei Corporation, "Delpet" is a registered trademark of the company), Dianal BR52, BR80, BR83, BR85, BR88 (manufactured by Mitsubishi Chemical Corporation, "Dianal" is a registered trademark of the company), KT7 (manufactured by DENKA Co., Ltd.), VINYBLAN 2680, 2682, 26884, 2685 (manufactured by Nissin Chemical Industry Co., Ltd., "VINYBLAN" is a registered trademark of the company), and Mowinyl 6800D manufactured by Japan Coating Resin Co., Ltd.).

Among these, it is preferable that the fixing resin contain an acid structure. When the acid structure is contained, dispersion in an aqueous solvent is possible without the addition of a surfactant, as a result, self-emulsification is possible, and the water resistance of the coating film is improved. Such self-emulsifying resins may be dispersion-stabilized in aqueous solvents solely by the ionic properties of the molecules. Examples of the acid structure include a carboxy group (—COOH), sulfonic acid groups (—$SO_3H$) and other acid groups. Acid structures may be present in the side chains or at the ends of the structure.

It is preferable that some or all of the above acid structures is neutralized. By neutralizing the acid structure, the water dispersibility of the resin may be improved. Organic amines are preferred as examples of the neutralizer that neutralizes the acid structure. Examples thereof are trimethylamine, triethylamine, tripropylamine, tributylamine, N-methyldiethanolamine, and triethanolamine.

(Surfactant)

The ink may optionally contain a surfactant. This may improve the ejection stability of the ink and control the spread (dot diameter) of the droplets that land on the substrate.

Surfactants may be used without restriction as long as they do not impair the effects of the invention. However, when anionic compounds are included in other components of the ink, the ionic nature of the surfactant is preferably an anionic, a nonionic or a betaine type.

In the present invention, the following surfactants are preferably used: fluorinated or silicone surfactants with high static surface tension lowering ability, anionic surfactants such as dioctyl sulfosuccinate with high dynamic surface tension lowering ability, nonionic surfactants such as polyoxyethylene alkyl ethers of relatively low molecular weight, polyoxyethylene alkylphenyl ethers polyoxyethylene alkyl phenyl ethers, acetylene glycols, Pluronic™ type surfactants, and sorbitan derivatives. It is also preferable to use fluorinated or silicone surfactants in combination with surfactants with high dynamic surface tension reduction ability.

By adding a silicone or fluorine surfactant as a surfactant, ink blending may be further suppressed on substrates made of various hydrophobic resins such as vinyl chloride sheets, and on slow-absorbing substrates such as printing paper, resulting in obtaining high quality printed images.

The above silicone surfactant is preferably a polyether-modified polysiloxane compound. Examples thereof include KF-351A and KF-642 manufactured by Shin-Etsu Chemical Co., Ltd., and BYK345, BYK347 and BYK348 manufactured by BYK-Chemie.

The above-mentioned fluorine-based surfactant means one in which a part or all of the hydrogen atoms bonded to carbon of the hydrophobic group of a normal surfactant is replaced with a fluorine atom. Of these, those having a perfluoroalkyl group in the molecule are preferred.

Among the above fluorinated surfactants, some are sold under the following trade name of: Megafac F by Dainippon Ink & Chemicals, Surflon by Asahi Glass, Fluorad FC from Minnesota Mining and Manufacturing Company, Monflor from Imperial Chemical Industries, Inc., Zonyls from E.I. du Pont de Nemours & Co., Licowet VPF from Farwerke Hoechst, respectively.

The surfactant content in the ink is not particularly limited, but it is preferably in the range of 0.1 to 5.0 mass %.

(Other Additives)

In addition to the above, the ink used in the present invention may also be modified with various known additives, such as polysaccharides, viscosity adjusters, resistivity adjusters, film formers, UV absorbers, and other additives as needed to the extent not to impair the effects of the invention to improve emission stability, print head and ink cartridge compatibility, storage stability, image preservation, and various other performance characteristics.

Specific examples thereof include oil droplet particles of liquid paraffin, dioctyl phthalate, tricresyl phosphate, and silicone oil: UV absorbers described in JP-A 57-74193, JP-A 57-87988, and JP-A 62-261476; anti-fading agents described in JP-A 57-74192, JP-A 57-87989, JP-A 60-72785, JP-A 61-146591, JP-A 1-95091, and JP-A 3-13376; and fluorescent whitening agents described in JP-A 59-42993, JP-A 59-52689, JP-A 62-28069, JP-A 61-242871 and JP-A 4-219266.

The ink is prepared by mixing each of the above components to the above content. Preferably, the pigment is mixed with the other components as a dispersion partially dispersed in an aqueous solvent by a pigment dispersant. When the fixing resin is included, the fixing resin is preferably mixed with the other components as a dispersion partially dispersed in an aqueous solvent by means of a surfactant added as necessary.

[Outline of Image Forming Method]

The image forming method of the present invention has the following features in an image forming method having a landing step in which inkjet ink droplets are ejected from an inkjet head equipped with an ink circulation mechanism and landed on a substrate.

(2-1) The inkjet ink contains an aqueous solvent, a pigment, and a thixotropy-imparting agent, and is circulated in the inkjet head with a viscosity of 15 mPa·s or less.

(2-2) When the droplet lands on the substrate, or immediately after landing, the droplet preferably has a mass loss rate of 20% or less from the inkjet ink and a viscosity of 150 mPa·s or more during the landing step.

The image forming method of the present invention usually further has a drying step to remove the aqueous solvent from the ink droplets on the substrate after the landing step. Through the drying step, the desired image is formed on the substrate. The image forming method of the present invention may also have a step for forming a primer layer on the surface of the substrate before forming a coating film with the above ink (hereinafter referred to as the "primer layer forming step"). In this case, the ink droplets are deposited on the primer layer in the above-mentioned landing step.

(Primer Layer Formation Step)

The primer layer may be formed by applying a primer ink containing a resin and a solvent on a substrate and allowing it to dry. It may also be formed by applying a primer ink containing an active energy polymerizable compound and a polymerization initiator, and irradiating the coated film with active energy.

Primer ink application methods are not restricted and may be any of the following: roll coating, spin coating, spray coating, dipping, screen printing, inkjet printing, gravure printing, and offset printing. Among these, the screen printing or the inkjet method is preferred when the surface roughness of the substrate is finely controlled, and the inkjet method is especially preferred.

The method of curing or drying the coating film after application of primer ink is selected according to the type of primer ink, and may be, for example, heating or irradiating with active energy.

(Landing Step)

In the landing step, when the viscosity of the ink in the head is 15 mPa·s or less according to the above (2-1), the ink may be smoothly circulated in the head and discharged from the head. It is preferable that the viscosity of the ink in the head is circulated so as to be 10 mPa·s or less.

In relation to (2-2) above, the rate of mass loss from inkjet ink (hereinafter simply referred to as "mass loss rate") may be defined in the same way as the ink drying rate explained above. If the mass loss rate and viscosity of the ink droplet when it lands on the substrate or immediately after landing are within the above ranges, good pinning is possible and the resulting image may be of high quality. In addition, the sticking of the solid ink content around the head is suppressed, ejection defects are less likely to occur, and maintenance is easier.

Immediately after landing means, for example, a period within 100 msec after an ink droplet lands on a substrate. When the mass loss rate of the ink droplet within 100 msec after landing on the substrate is 20% or less and viscosity of 150 mPa·s or more, the above effects are sufficiently expressed. Here, when the ink droplet lands on the substrate or immediately after landing on the substrate is hereinafter also referred to as "at the time of landing on the substrate". The viscosity of the ink droplet at the time of landing on the substrate is preferably 200 mPa·s or more, and more preferably 300 mPa·s or more. As for immediately after landing, the guideline is within 30 msec when the transfer speed of the substrate is high (100 m/min), and it is within 100 msec when the transfer speed is 50 m/min.

In the image forming method of the present invention, the ink or the device is selected as appropriate to satisfy the conditions of (2-1) and (2-2) above. In the image forming method of the present invention, by using the ink of the present invention as described above, the conditions (2-1) and (2-2) may be achieved without any particular change in the device. In other words, in the image forming method of the present invention, it is preferable to use the ink of the present invention as described above.

In the image forming method of the present invention, in order to satisfy the condition of (2-2), the ink droplets are preferably heated on the substrate at a temperature in the range of 30 to 60° C. during the landing step. In other words, in the image forming method of the present invention, in order to achieve the state of the ink droplets at the time of landing on the substrate to be such that the mass loss rate is within 20% and the viscosity is 150 mPa·s or higher, it may have a step of heating the droplets of the ink to a temperature of 30 to 60° C. The temperature is low enough that there is little concern of ink sticking around the head and causing ejection failure.

Heating may be performed, for example, using a non-contact heating device such as a thermostatic furnace or a hot air blower, or using a contact heating device such as a hot plate or a hot roller.

The heating temperature may be obtained by measuring one of the following: (a) an ambient temperature such as a furnace temperature or a hot air temperature when using a non-contact heating device such as a thermostatic furnace or a hot air blower, (b) a contact temperature when using a contact heating device such as a hot plate or a hot roller, or (c) a surface temperature of the ink droplet. Measuring of (c) a surface temperature of the ink droplet is more preferable as a measurement location.

(Drying Step)

The drying step removes components other than solid components such as aqueous solvents (hereinafter also referred to as "volatile components") from the ink droplets after the landing step to form a coating film that constitutes the desired image on the substrate or on the primer layer if there is a primer layer. As described above, the ink droplets after the landing step are in a state where the mass loss rate is within 20%. Since the inkjet ink contains, for example, 50 to 90 mass % of the aqueous solvent, the remaining volatile components including aqueous solvent are removed by the drying step.

In the drying step, while removing volatile components, if the ink contains a fixing resin, it is preferable to dry the ink under conditions such that the fixing resin is not completely fused. The drying temperature, for example, is preferably in the range of 60 to 110° C. The drying time, for example, is preferably in the range of 5 to 60 seconds. Drying in the drying step may be performed, for example, in the same manner as heating in the landing step.

(Substrate)

The substrate that may be used for the present invention is not limited, but it is preferred to be a non-absorbent substrate. By using a non-absorbent substrate, the effect of the method of image formation is more pronounced. In the present invention, non-absorbent means non-absorbent to water.

Examples of the non-absorbent substrate include films of known plastics. Specific examples include polyester film such as polyethylene terephthalate, polyethylene film, polypropylene film, polyamide film such as nylon, polystyrene film, polyvinyl chloride film, polycarbonate film, polyacrylonitrile film, biodegradable films such as polylactic acid film. In addition, polyvinylidene chloride coated on one or both sides of the film or metal oxide vapor-deposited film may be preferably used to provide gas barrier, moisture-proofing, and aroma retention properties. Non-absorbent films may preferably be used either as unstretched or stretched films.

In addition to these, non-absorbent substrates include those made of inorganic compounds such as metals and glass.

It may also be suitably used for packaging materials for retort pouch foods, which are coated with a thermosetting resin as a coating layer on a metal base material. The packaging material for retort-packed foods blocks air, moisture, and light, and seals the food inside. Therefore, for example, it is composed of a film made by laminating (laminate processed) a thermoplastic resin layer or aluminum foil layer that blocks air, moisture, and light such as polypropylene on the food side and polyester on the outside and seals the food inside.

In the present invention, the thickness of the substrate is preferably in the range of 10 to 120 μm, more preferably in the range of 12 to 60 μm.

(Inkjet Head)

The image forming method of the present invention is applicable to image formation using an inkjet head equipped with an ink circulation mechanism.

The inkjet heads are not limited as long as they are equipped with an ink circulation mechanism. The above inkjet head may be either on-demand or continuous inkjet heads. Examples of the on-demand inkjet print head include electro-mechanical conversion type such as single-cavity type, double-cavity type, bender type, piston type, shear mode type, and sheared wall type, as well as electro-thermal conversion type including thermal inkjet type and bubble jet type ("Bubble Jet" is a registered trademark of Canon Inc.).

Among the above inkjet print heads, it is preferable to use an inkjet print head that uses a piezoelectric element (also called a piezoelectric inkjet print head) as the electro-mechanical conversion element used in the electro-mechanical conversion method.

The inkjet head may be either a scan type or a line type inkjet head, but the line type is preferred.

A line inkjet print head is an inkjet print head that has a length greater than or equal to the width of the printing range. A single line inkjet print head may be used that is longer than the width of the printing range, or multiple print heads may be combined to be longer than the width of the printing range.

Multiple heads may also be arranged in a staggered array of nozzles to increase the resolution of these heads as a whole.

The inkjet head used for the image forming method of the present invention is preferably provided with: a pressure chamber into which the inkjet ink is injected via an injection path; a pressure generating device for generating pressure fluctuation in the pressure chamber; a nozzle that communicates with the pressure chamber and serves as a flow path for the inkjet ink ejected from the pressure chamber to the outside due to pressure fluctuation in the pressure chamber; and two or more circulation paths that communicate with the pressure chamber, eject the inkjet ink inside the nozzle, and return the inkjet ink to the injection path. Such an inkjet head is described below using the drawings.

FIG. 1 is a schematic diagram of an inkjet image forming apparatus 100 equipped with an example of an inkjet head that may be used in the image forming method of the present invention. An inkjet head 1 is shown in partial cross-section. The inkjet head shown in FIG. 1 is an examples, and the inkjet head to which the image forming method of the present invention may be applied is not limited thereto.

The inkjet image forming apparatus 100 ejects ink droplets from the inkjet head 1 and lands them on a substrate 109 conveyed in a fixed direction (sub-scanning direction) by a conveying device 108, and dries the droplets to form an image. In the one-pass inkjet image forming apparatus, the inkjet head 1 is fixedly positioned, and in the process of transporting the substrate 109, ink droplets are ejected from the nozzle 22 toward the substrate 109 and are landed on the substrate to form an image. In the scan-type inkjet image forming apparatus, the inkjet head 1 is mounted on a carriage mechanism 107. The head 1 is moved back and forth in the main scanning direction by the carriage mechanism 107, and ink droplets are ejected from the nozzle 22 onto the substrate 109 to form an image on the substrate. The transport device 108 and carriage mechanism 107 are driven and controlled by the control unit 104.

Although only one inkjet head 1 is shown in FIG. 1, generally an inkjet imaging apparatus 100 is equipped with a plurality of inkjet heads 1 for each color ink, such as yellow (Y), magenta (M), cyan (C), and black (K). In the inkjet image forming apparatus 100, the ink tank 101 for storing ink and the common ink chamber 41 of the inkjet head 1 are communicated with each other by an ink transfer tube 102 as a transfer path and an ink return tube 103 as a recovery path.

In the middle of the ink transfer tube 102, there is a transfer pump 105a that is driven and controlled by the control unit 104 of the inkjet image forming apparatus 100. When the transfer pump 105a is driven, the ink in the ink tank 101 is transferred to the inkjet head 1 via the ink transfer tube 102.

Furthermore, a transfer side sub-tank 111a is provided in the middle of the ink transfer tube 102. The transfer side sub-tank 111a is configured as a buffer space where the ink to be transferred to the inkjet head 1 is temporarily stored. The pressure of the ink in the ink transfer tube 102 may be controlled by the transfer pressure control pump 110a constituting the pressure control device via the transfer side sub-tank 111a. The transfer pressure control pump 110a is controlled by the control unit 104a in the inkjet head 1.

In the middle of the ink return tube 103, a return pump 105b is provided which is driven and controlled by the control unit 104. When the return pump 105b is driven, the ink in the inkjet head 1 is returned to the ink tank 101 through the ink return tube 103.

Furthermore, a return side sub-tank 111b is provided in the middle of the ink return tube 103. The return side sub-tank 111b is configured as a buffer space where the ink returned from the inkjet head 1 is temporarily stored.

The pressure of the ink in the ink return pipe 103 may be controlled by the return pressure control pump 110b constituting the pressure control device via the return side sub-tank 111b. The return pressure control pump 110b is controlled by the control unit 104a in the inkjet head 1.

The pressure control device is not limited to those comprising the transfer pressure control pump 110a and the return pressure control pump 110. It may be composed of any one of these. In this case, the return pressure control pump 110b serves as the first pressure control device and the transfer pressure control pump 110a will be the second pressure control device.

The ink tank 101 is not particularly limited, but it is preferable to partition the ink tank 101 into an ink transfer chamber 101b and an ink return chamber 101c by a partition plate 101a that does not reach the bottom surface of the tank. In this case, one end of the ink transfer tube 102 is arranged in the ink transfer chamber 101b, and one end of the ink return tube 103 is arranged in the ink return chamber 101c. The partition plate 101a is provided to sufficiently degas the ink so that air bubbles contained in the ink returned to the ink return chamber 101c do not flow back into the ink transfer tube 102. Since air bubbles themselves have high buoyancy, they are prevented from passing through the bottom of the partition plate 101a and flowing into the ink transfer chamber 101b. This is a preferred embodiment when the ink is used in circulation.

The inkjet head 1 is configured by including an ink manifold 4 constituting a common ink chamber 41, a wiring board 3 bonded to the ink manifold 4, a head chip 2 bonded to a lower surface portion of the wiring board 3, and a nozzle plate 21 adhered to lower surface of the head chip 2.

The ink manifold 4 is formed of a synthetic resin material into a horizontal box shape with an opening 4a in the lower surface. The opening 4a of the ink manifold 4 is sealed by the wiring substrate 3 bonded to the bottom surface. The interior space of the ink manifold 4 is the common ink chamber 41 where the ink transferred from the ink tank 101 is stored. The wiring substrate 3 is, for example, a glass substrate. The wiring substrate 3 has a wiring pattern (not shown) that is connected to a power circuit via an FPC substrate not shown.

The common ink chamber 41 is connected to an ink supply tube 5a, which serves as a flow path for supplying the ink to the common ink chamber 41. The ink supply tube 5a is connected to the common ink chamber 41 on the side far from the circuit board 3 (upper side). A connection 7a is provided at the upper end of the ink supply tube 5a. The connection 7a is detachably connected to the connection 106a on the inkjet image forming apparatus 100 side. The connection 106a on the inkjet image forming apparatus 100 side is connected to the ink transfer tube 102. This enables the inkjet head 1 to transfer the ink from the ink tank 101 and supply the ink to the common ink chamber 41.

The common ink chamber 41 is connected to the ink recovery tube 5b, which serves as a flow path for recovering ink from the common ink chamber 41. The ink recovery tube 5b is connected to the common ink chamber 41 on the side far from the circuit board 3 (upper side). A connection 7b is provided at the upper end of the ink recovery tube 5b. The connection 7b is detachably connected to the connection 106b on the inkjet image forming apparatus 100 side. The connection 106b on the inkjet image forming apparatus 100 side is connected to the ink return tube 103. This enables the inkjet head 1 to collect the ink from the common ink chamber 41 and return the ink to the ink tank 101.

In the inkjet head 1, the flow path from the ink supply tube 5a to the buffer space section 6 in the middle of the ink recovery tube 5b is a main flow path F1.

Figure 2:
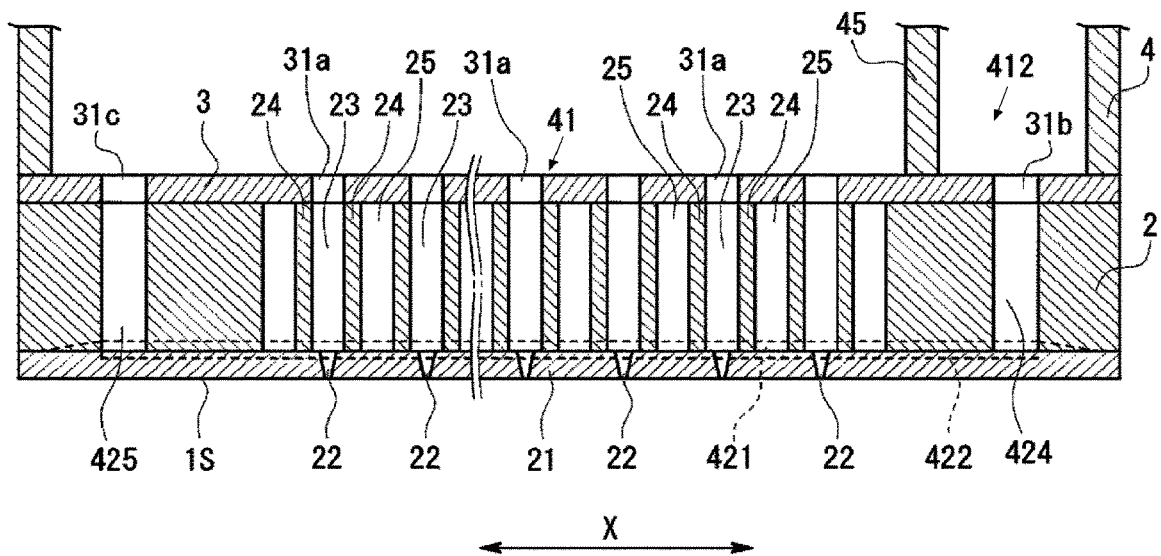
FIG. 2 is an enlarged cross-sectional view of the head chip of the inkjet head shown in FIG. 1.
Figure 3:
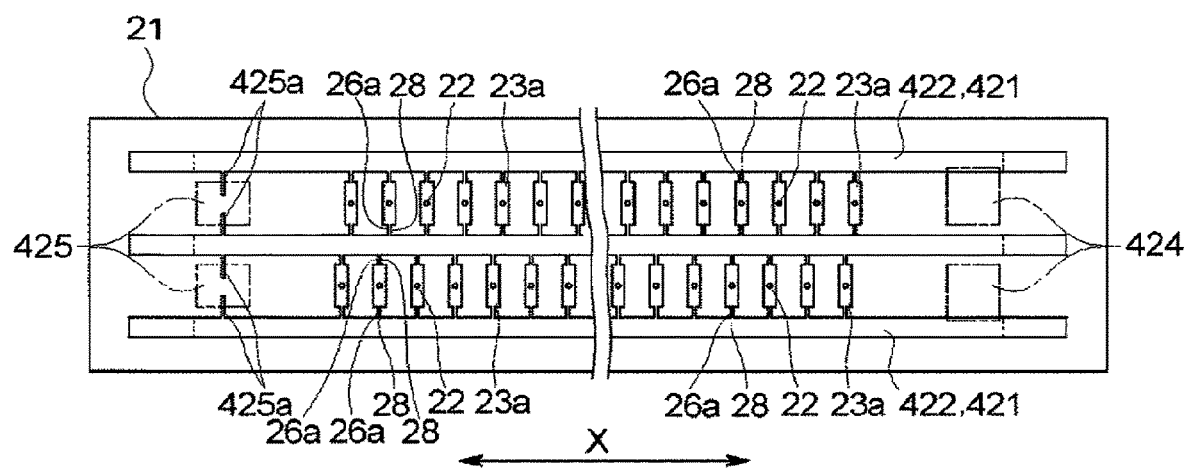
FIG. 3 is a plan view of the nozzle plate of the inkjet head shown in FIG. 1.

FIG. 2 is an enlarged cross-sectional view of the head chip 2 of the inkjet head 1. FIG. 3 is a plan view of the nozzle plate 21 of the inkjet head 1.

A plurality of ink channels (pressure chambers) 23 and a plurality of dummy channels (pseudo pressure chambers) 25 are formed in the head chip 2. Each ink channel 23 and each dummy channel 25 are perforations drilled from the top surface to the bottom surface of the head chip 2. Each ink channel 23 is connected to the common ink chamber 41 through the injection holes 31a in the wiring substrate 3. Each ink channel 23 is filled with ink flowing from the injection hole 31a by the potential energy of the ink in the ink tank 101 and the pressure controlled by the transfer pressure control pump 110a due to the transfer pump 105a.

The lower end of each ink channel 23 is connected outward (downward) through the nozzle 22. In this inkjet head 1, the inner side than the nozzle 22 is inside the ink channel 23. When there is a connecting passage between the ink channel 23 and the nozzle 22, the inner side than the nozzle 22 is inside the connecting passage. Each dummy channel 25 is a sealed air chamber with the upper end closed by the wiring substrate 3 and the lower end closed by the nozzle plate 21. Each ink channel 23 and each dummy channel 25 are arranged in one direction (arrow X direction in FIG. 2) to form a channel row.

Both walls of each ink channel 23 (the partition wall between ink channel 23 and dummy channel 25) are composed of a pair of piezoelectric elements (drive walls) 24 and 24, which serve as the pressure generating means. The piezoelectric elements 24 and 24 are sheared and deformed by applying a voltage from a power supply circuit (not shown) via the wiring pattern of the FPC board and the wiring board 3. Shear deformation of the piezoelectric elements 24 and 24, which form both walls of the ink channel 23, causes pressure fluctuations in the ink channel 23 (pressure reduction by expansion or pressure increase by contraction). The pressure fluctuation (decreasing or increasing pressure) in the ink channel 23 causes pressure to be applied to the ink inside the nozzle 22, i.e., the ink in the ink channel 23, and this ink is ejected through the nozzle 22.

Two piezoelectric elements 24 and 24 are provided per ink channel 23 (a pair), and they from two walls for each ink channel 23. There is a void between the piezoelectric element 24 that constitutes the wall portion of one ink channel 23 and the piezoelectric element 24 that constitutes the wall portion of the adjacent ink channel 23, and this void is the dummy channel 25. Thus, each ink channel 23 may be driven (depressurized or pressurized) independently.

The head chip 2 has an introduction channel 425. The introduction channel 425 is provided so as to be located outside one end side of the channel row formed by each ink channel 23 and each dummy channel 25. The introduction channel 425 is a perforated hole drilled from the top surface to the bottom surface of the head chip 2, and has a cross-sectional opening area larger than the cross-sectional opening area of one ink channel 23. The upper end of the introduction channel 425 is connected to the common ink chamber 41 via the introduction hole 31c opened in the wiring substrate 3. The ink flows in from the introduction hole 31c caused by the potential energy of the ink in the ink tank 101 and the pressure controlled by the transfer pressure control pump 110a due to the transfer pump 105a.

A flat nozzle plate 21 bonded to the underside of the head chip 2 is perforated with a plurality of nozzles 22 corresponding to each ink channel 23. The nozzle 22 is a perforation that allows the ink channel 23 to be connected to the outside. The Ink in each ink channel 23 is given discharge pressure by the action of the piezoelectric element 24 and is ejected through the nozzle 22 toward the substrate outside (below). That is, the nozzle 22 serves as a flow path for the ink ejected from the inside of each ink channel 23 to the outside (downward). The lower surface of the nozzle plate 21 becomes an ink ejection surface 1S.

The inkjet head 1 is equipped with a nozzle circulation mechanism that allows the ink injected into ink channel 23 to be ejected from the vicinity of nozzle 22 and returns it to the injection path to the ink channel 23. Two individual ink circulation paths 26a and 26a are communicated with each ink channel 23, respectively.

The individual ink circulation paths 26a and 26a communicate with the ink channel 23 at both ends in the longitudinal direction of the cross section of the ink channel 23. Since air bubbles often remain in the vicinity of both ends of the ink channel 23, it is desirable to provide the individual ink circulation channels 26a and 26a at both ends of the ink channel 23 in the longitudinal direction of the cross section of the ink channel 23. The individual ink circulation channels 26a and 26a may be connected to the ink channel 23 at any point of the ink channel 23. The number of individual ink circulation channels 26a for one ink channel 23 may be increased or decreased, but two or more is preferred. Since there are two or more circulation channels, even a thixotropic ink may be circulated without stagnation, and air bubbles in the nozzle may be easily removed.

The individual ink circulation channels 26a and 26a are configured by closing a channel forming groove 28 formed on the upper surface of the nozzle plate 21 with a starting end in the vicinity of the nozzle 22 by the lower surface of the head chip 2.

The introduction channel 425 has two introduction grooves 425a and 425a connected to the introduction channel 425. The introduction grooves 425a and 425a are connected to the introduction channel 425 at both sides of the introduction channel 425. The introduction grooves 425a, 425a are connected to the introduction channel 425 at any point in the introduction channel 425. The number of introduction grooves 425a, 425a for one introduction channel 425 may be increased or decreased.

The introduction grooves 425a and 425a are formed on the upper surface of the nozzle plate 21 with a start end in the vicinity of the introduction path 425, and are closed by the lower surface of the head chip 2 to form a flow path.

A common ink circulation channel 421 is formed on the lower surface of the head chip 2. The common ink circulation path 421 is configured by abutting a groove formed on the lower surface portion of the head tip 2 and a groove 422 formed on the upper surface portion of the nozzle plate 21.

The common ink circulation channel 421 is composed of a plurality of channels formed in the direction of the channel row (X direction). Each individual ink circulation channel 26a and 26a connected to each ink channel 23 is merged by being connected to the common ink circulation channel 421. Due to the pressure difference between each ink channel 23 and the common ink circulation channel 421, the ink flows from each ink channel 23 to the common ink circulation path 421. In addition, the introduction grooves 425a and 425a are connected to the common ink circulation channel 421. The pressure difference between the introduction channels 425 and the common ink circulation channel 421 causes the ink to flow from the introduction channel 425 to the common ink circulation path 421. Then, these flows merge to produce ink flow in the common ink circulation path 421.

The other end of the common ink circulation channel 421 is connected to the lower end of the discharge channel 424 formed in the head chip 2. The discharge channel 424 is located outside of the other end of the channel row composed of each ink channel 23 and each dummy channel 25. Since the ink flow rate in the discharge channel 424 is higher than the ink flow rate in the introduction path 425 by the amount of ink merging through each ink channel 23, the cross-sectional opening area of the discharge channel 424 is increased so as not to increase the flow path resistance.

The ink discharged from the individual ink circulation path 26a communicating with the ink channel 23, which is the pressure chamber, to the common ink circulation path 421 reaches the buffer space 6 via the discharge channel 424, the ink discharge chamber 412, and the ink discharge tube 5c. Further, it is returned to the ink tank 101 by the above route. Then, it is introduced into the injection path to the ink channel 23 again.

As shown in FIG. 1, in the ink manifold 4, an ink discharge chamber 412 is provided above the discharge channel 424. The ink discharge chamber 412 is provided adjacent to the common ink chamber 41 in the ink manifold 4. The ink discharge chamber 412 is separated from the common ink chamber 41 by a partition 45. The partition 45 may be integrally formed in the ink manifold 4.

In this way, some of the ink that flows into ink channel 23 from injection hole 31a (the ink that is not ejected from the nozzle 22) flows from the individual ink circulation channels 26a and 26a to the common ink circulation channel 421 to the discharge channel 424, and through the discharge holes 31b formed on the circuit board 3, and it reaches into the ink discharge chamber 412. Further, the ink flowing into the introduction path 425 from the introduction hole 31c reaches the discharge channel 424 via the introduction groove 425a and 425a and the common ink circulation path 421, and reaches the ink discharge chamber 412 through the discharge hole 31b.

An ink discharge tube 5c that forms a flow path for discharging ink from the inside of the ink discharge chamber 412 is connected to the ink discharge chamber 412 via a circulation path connection 5d. The circulation path connection 5d is located above the discharge channel 424 and is located outside the channel row on the other end side of the channel row formed by each ink channel 23 and each dummy channel 25. The upper end side of the ink ejection tube 5c joins the ink recovery tube 5b. The ink recovery tube 5b and the ink discharge tube 5c join by being connected to the buffer space section 6.

In the inkjet head 1, a flow path from the introduction path 425, the individual ink circulation paths 26a and 26a, the common ink circulation path 421, the discharge channel 424, the discharge hole 31b, the ink discharge chamber 412, and the ink discharge pipe 5c to the buffer space 6 becomes the circulation path 423. The circulation channel 423 is connected to the introduction channel 425 and the ink channel 23, and the ink in the introduction channel 425 and the ink channel 23 is discharged and merged into the ink recovery tube 5b in the buffer space section 6. However, as long as the circulation path 423 is capable of discharging ink from the individual ink circulation paths 26a and 26a in the vicinity of the nozzle 22 and returns this ink to the injection path to the ink channel 23, it is not necessary to limit the route in the middle. Then, the portion including the introduction hole 31c and each injection hole 31a, up to the circulation path 423 becomes a sub-flow path F2.

EXAMPLES

Hereinafter, the present invention will be specifically described with reference to examples, but the present invention is not limited thereto. In addition, although the description of "parts" or "%" is used in the examples, it represents "parts by mass" or "mass %" unless otherwise specified.

Examples 1 to 16, Comparative Examples 1 to 3

The following materials were used to prepare inkjet inks for each of the examples and comparative examples with compositions shown in Table I or Table II.

(Thixotropy-Imparting Agent)
  Cellenpia TC-01A (product name, manufactured by Nippon Paper Industries, cellulose nanofiber, average width: 3 to 4 nm, average length: 0.8 μm, aspect ratio: 200)
  Cellenpia TC-02X (product name, manufactured by Nippon Paper Industries, cellulose nanofiber, average width 3 to 4 nm, average length 0.4 μm, aspect ratio 100)
  Laponite RD (product name, manufactured by BYK Chemie, smectite clay mineral, average thickness: 0.92 nm, average length: 25 nm, aspect ratio: 27)
  Xanthan gum
  METOLOSE SM-04 (product name, manufactured by Shin-Etsu Chemical Co., Ltd., methylcellulose resin, lower critical co-melting temperature: 55° C.)
  Magenta pigment: JM2120 (product name, manufactured by DIC Corp., compound name: PR202/PV19)
  Pigment dispersant: Joncryl 819 (product name, manufactured by BASF, acrylic dispersant having a carboxy group neutralized with sodium hydroxide, acid value: 75 mg KOH/g, solid content: 20 mass %)
  Water: Ion-exchanged water
(Aqueous Solvent)
  Ethylene glycol
  Propylene glycol
  Glycerin
  Polyethylene glycol 200 (molecular weight: 200)

(Fixing Resin)
  Vylonal MD-2000 (product name, manufactured by Toyobo Co., Ltd., water dispersion liquid of polyester resin with an average molecular weight of 1,8000, solid content: 40 mass %)
  Mowinyl 6800D (product name, manufactured by Japan Coating Resin Co., Ltd., water dispersion of polyacrylic resin, solid content: 45 mass %)
  Evafanol HA-560 (product name: manufactured by NIKKA Chemical Co., Ltd., water dispersion liquid of polyurethane resin, solid content: 35 mass %)
(Surfactant)
  KF-351A (product name, manufactured by Shin-Etsu Chemical Co., Ltd., polyether-modified polysiloxane compound)
  OLFINE E1010 (product name, manufactured by Nissin Chemical Industry Co., Ltd., acetylene glycol)
(Preparation of Pigment Dispersion Liquid)

6.5 parts by mass of magenta pigment (JM2120), 13 parts by mass of pigment dispersant (Joncryl 819) (2.6 parts by mass as solid portion), 30.5 parts by mass of aqueous solvent composed of ethylene glycol and ion-exchanged water at a mass ratio of 100:68 were added were pre-mixed. After pre-mixing, the mixture was dispersed using a sand grinder filled with 0.5 mm zirconia beads 50% by volume to prepare a pigment dispersion liquid with a pigment content of 18 mass %. The average particle diameter of the pigment particles in this pigment dispersion liquid was 110 nm. The average particle diameter was measured by the "Zetasizer 1000HS" manufactured by Malvern Corporation.

(Preparation of Inkjet Ink)

The pigment dispersion liquid obtained above and the mixture obtained by mixing the above ingredients to achieve the compositions shown in Table I or Table II were filtered through a 1 μm filter to obtain an inkjet ink. In Table I or Table II, the content (mass %) of each component indicates the solid content of the component when a dispersion liquid or a solution is used as the component. For example, for Vylonal MD-2000 in Example 1, the content of polyester resin itself, excluding the amount of water as a dispersing medium, is 5.0 mass %. Blank columns in the composition columns of Table I or Table II indicate that the component is not contained.

(Evaluation of Ink Properties)

The inks obtained above were evaluated for the following properties (A1) through (A7). The results are shown in Table I or Table II.

(A1) Viscosity at shear rate 1000 (1/s)
(A2) Viscosity at shear rate 1 (1/s)
(A3) Viscosity at shear rate 1 (1/s) at ink drying rate of 20%
(A4) Viscosity at shear rate 1 (1/s) at ink drying rate of 50%
(A5) Loss tangent (tan δ) at 1% distortion at ink drying rate of 20%
(A6) Crossover distortion between storage elastic modulus and loss elastic modulus at ink drying rate of 20%
(A7) Thixotropy index The above values of (A1) through (A7) were measured at 25° C. using a device MCR102 manufactured by Anton Paar Corporation. (A4) was measured only in the Comparative Example 3.

Figure 4:
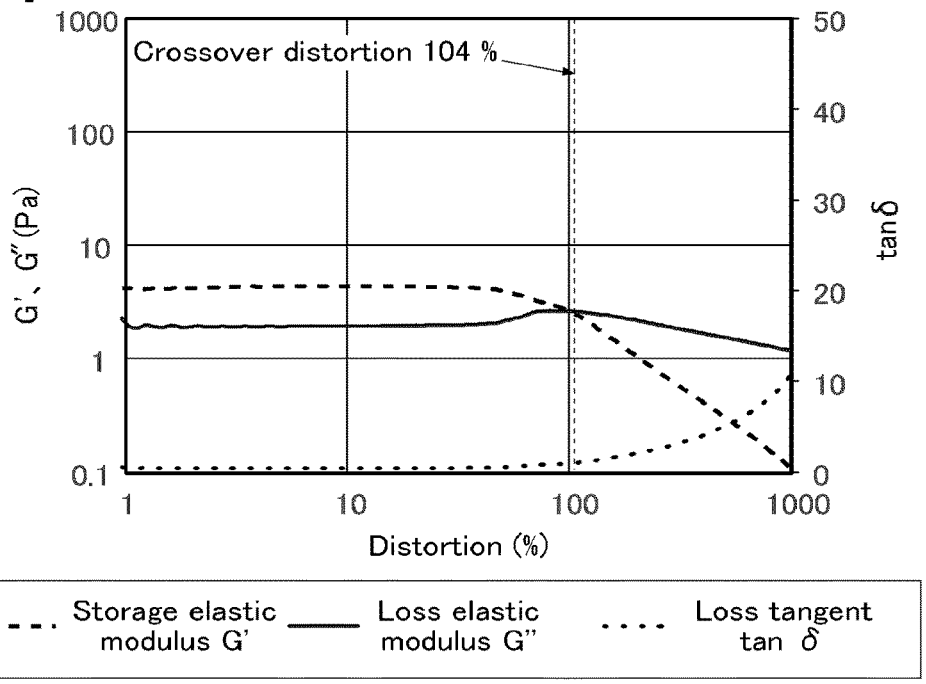
FIG. 4 is a graph used to determine the crossover distortion (%) of the ink in Example 1

(A5) and (A6) were measured by changing the distortion in the oscillation mode of MCR102 under the measurement conditions in which the angular frequency ω was 10 rad/s and the swing angle γ was in the range of 1 to 1000%. FIG. 4 shows the graph indicating the relationship between the loss tangent (tan δ), the storage elastic modulus G' (logarithm), and the loss elastic modulus G" (logarithm) and the distortion (logarithm) of the ink in Example 1, measured under the above conditions at an ink drying rate of 20%. From the graph, the loss tangent (tan δ) at 1% distortion in (A4) and the crossover distortion in (A5) were obtained.

Figure 5:
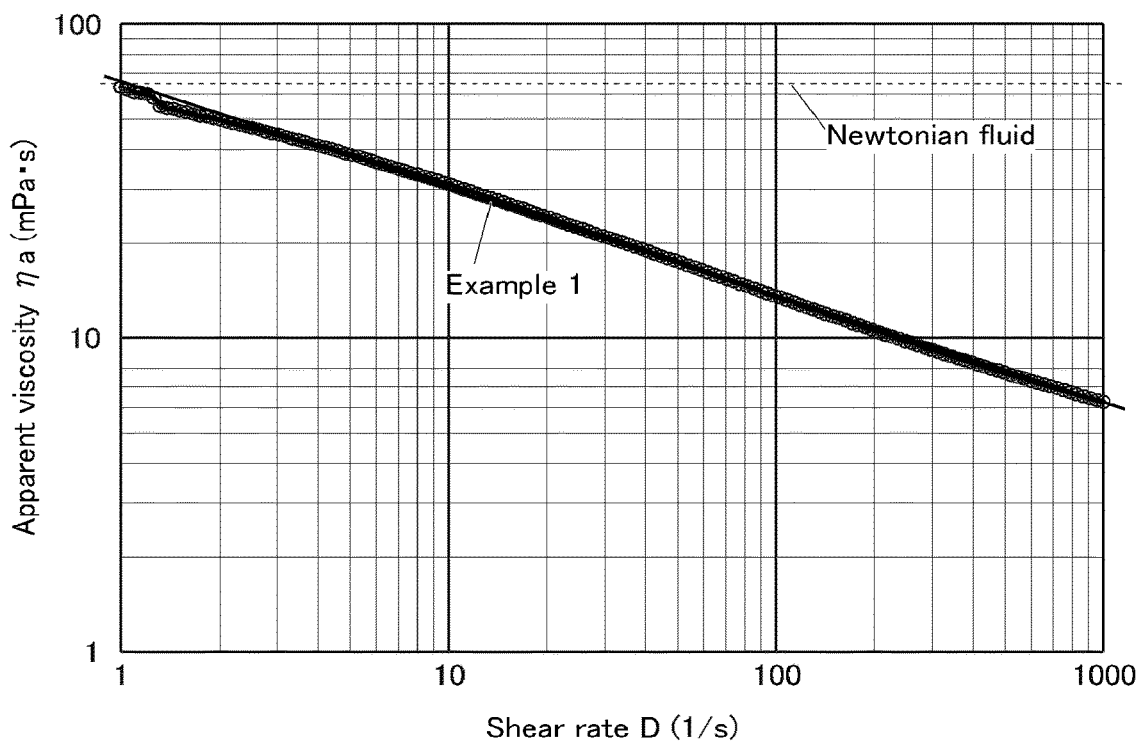
FIG. 5 is a graph used to determine the thixotropy index of the ink in Example 1.

Regarding (A7), in the rotation mode of MCR102, by making, the time setting: measurement point 150 points, measurement interval: 2s, the shear rate is in the range of 1000 (1/s) to 1 (1/s), the apparent viscosity ηa (mPa·s) is measured. In order to obtain n from the viscosity equation: $\eta a = \mu D^{n-1}$, a logarithmic graph is made with the apparent viscosity ηa (mPa·s) on the vertical axis (Y-axis) and the shear rate D (1/s) on the horizontal axis (X-axis), respectively. The thixotropy index n is obtained from the slope (n−1) of the obtained graph. The intercept of the graph is the non-Newtonian viscosity coefficient μ. FIG. 5 shows a graph representing the relationship between the measured apparent viscosity na (logarithm) and shear rate (logarithm) for the ink of Example 1. In FIG. 5, the dotted line indicates the graph for a Newtonian fluid.

(Evaluation of Print Characteristics of the Ink)

The ink obtained above was used in an inkjet image forming apparatus (inkjet printer) (manufactured by TriTek Corporation) with a head of KM1024iMHE manufactured by Konica Minolta, Inc. (having a mechanism that circulates the ink in the head using two or more circulatory paths). The resolution was set to 720×720 dpi, and the following print characteristics in (B1), (B2) and (B4) were evaluated. For (B3), an ink coating film was formed and evaluated by the following method. The results are shown in Table I or Table II.

(B1) Ejection Performance

A solid image and a straight line image were printed on a PET substrate, and the state of streaks in the solid portion and the state of formation of straight line were evaluated according to the following evaluation criteria.

(Evaluation Criteria)
  AA: No streak in the solid portion and clean printing of the straight line.
  BB: No streak in the solid portion, some fluttering in the straight line.
  CC: There is a white streak in the solid portion, and there is a missing in the straight line.

(B2) Image Quality (Pinning Property)

Images having a solid portion with void characters having a size of 4 pt, 6 pt, and 8 pt were printed on a PET substrate, and the quality of the characters was evaluated according to the following evaluation criteria.

(Evaluation Criteria)
  AA: All void characters are clearly printed.
  BB: Void characters of 6 pt or more are printed clearly.
  CC: There is bleeding in void characters of 6 pt or more.

(B3) Substrate Fixation

A PET substrate and a glass substrate were used as a substrate, respectively, and the substrate fixation of the ink coating film was evaluated by the following method. The ink coating film was obtained by applying an ink onto the substrate using a wire bar #7 and drying at 100° C. for 3 minutes. The resulting ink-coated film (100 mm×100 mm, 10 μm thick) was cut into 25 squares (5 vertical×5 horizontal) with a cutter. The film was then peeled off with Cellotape™ made by Nichiban Co., Ltd., and adhesion was evaluated according to the following evaluation criteria.

(Evaluation Criteria)
 AA: No peeling.
 BB: Peeling is observed within 5 squares.
 CC: Peeling is observed in 6 squares or more.
(B4) Water Resistance of Coating Film A solid image was printed on a PET substrate. Water was dropped with a dropper onto the obtained printed image (ink coating), and the surface of the printed image was rubbed 10 times with a cotton swab to evaluate the condition of the printed image according to the following evaluation criteria.
(Evaluation Criteria)
 AA: No change in printed image.
 BB: The printed image hardly changes, and the density becomes slightly lighter.
 CC: The printed image is changed and the image is distorted.

TABLE I

| | | | Example 1 | Example 2 | Example 3 | Example 4 | Example 5 |
|---|---|---|---|---|---|---|---|
| Composition (mass %) | Pigment | Magenta pigment | 4.0 | 4.0 | 4.0 | 4.0 | 4.0 |
| | Pigment Dispersion | Joncryl 819 | 1.6 | 1.6 | 1.6 | 1.6 | 1.6 |
| | Fixing resin | Polyester resin: Vylonal MD2000 | 5.0 | | | 5.0 | 5.0 |
| | | Polyacrylic resin: Mowinyl 6800D | | 5.0 | | | |
| | | Polyurethane resin: Evafanol HA-560 | | | 5.0 | | |
| | Thixotropy-imparting agent | Cellulose nanofiber: Cellenpia TC-01A | 0.100 | 0.100 | 0.100 | 0.010 | 0.250 |
| | | Cellulose nanofiber: Cellenpia TC-02X | | | | | |
| | | Smectite clay mineral: Laponite RD | | | | | |
| | | Xanthan gum | | | | | |
| | | Methyl cellulose resin: METOLOSE SM-4 | | | | | |
| | Surfactant | KF-351A | 0.2 | 0.2 | 0.2 | 0.2 | 0.2 |
| | | OLFINE E1010 | 1.0 | 1.0 | 1.0 | 1.0 | 1.0 |
| | Aqueous solvent | Ethylene glycol | 8.0 | 8.0 | 8.0 | 8.0 | 8.0 |
| | | Propylene glycol | 5.0 | 5.0 | 5.0 | 5.0 | 5.0 |
| | | Glycerin | 5.0 | 5.0 | 5.0 | 5.0 | 5.0 |
| | | Polyethylene glycol 200 | | | | | |
| | | Water | 70.1 | 70.1 | 70.1 | 70.2 | 70.0 |
| Evaluation | Ink physical properties | Total aqueous solvents | 88.1 | 88.1 | 88.1 | 88.2 | 88.0 |
| | | Viscosity [mPa · s], Shear rate 1000 (1/s) | 10.7 | 11.0 | 9.6 | 6.2 | 14.6 |
| | | Viscosity [mPa · s], Shear rate 1 (1/s) | 51 | 54 | 48 | 25 | 986 |
| | | Viscosity [mPa · s], Ink drying rate 20%, (*1) | 302 | 298 | 268 | 152 | 4321 |
| | | Viscosity [mPa · s], Ink drying rate 50%, (*1) | | | | | |
| | | Ink drying rate 20%, Loss tangent (tan δ) at 1% distortion | 0.537 | 0.543 | 0.521 | 0.782 | 0.482 |
| | | Ink drying rate 20%, Crossover distortion [%] | 104% | 104% | 104% | 36% | 180% |
| | | Thixotropy index | 0.78 | 0.78 | 0.79 | 0.85 | 0.64 |
| | Print propertie | Ejection performance | AA | AA | AA | AA | AA |
| | | Image quality (Pinning property) | AA | AA | AA | BB | AA |
| | | Substrate fixation (PET) | BB | BB | BB | BB | 88 |
| | | Substrate fixation (glass) | AA | AA | AA | AA | AA |
| | | Water resistance of coating film | AA | AA | AA | AA | AA |

| | | | Example 6 | Example 7 | Example 8 | Example 9 | Example 10 |
|---|---|---|---|---|---|---|---|
| Composition (mass %) | Pigment | Magenta pigment | 4.0 | 4.0 | 4.0 | 4.0 | 4.0 |
| | Pigment Dispersion | Joncryl 819 | 1.6 | 1.6 | 1.6 | 1.6 | 1.6 |
| | Fixing resin | Polyester resin: Vylonal MD2000 | 5.0 | 5.0 | 5.0 | 5.0 | 5.0 |
| | | Polyacrylic resin: Mowinyl 6800D | | | | | |
| | | Polyurethane resin: Evafanol HA-560 | | | | | |
| | Thixotropy-imparting agent | Cellulose nanofiber: Cellenpia TC-01A | 0.500 | | | | |
| | | Cellulose nanofiber: Cellenpia TC-02X | | 2.000 | | | |
| | | Smectite clay mineral: Laponite RD | | | 0.250 | 0.500 | |
| | | Xanthan gum | | | | | 0.070 |
| | | Methyl cellulose resin: METOLOSE SM-4 | | | | | |
| | Surfactant | KF-351A | 0.2 | 0.2 | 0.2 | 0.2 | 0.2 |
| | | OLFINE E1010 | 1.0 | 1.0 | 1.0 | .0 | 1.0 |
| | Aqueous solvent | Ethylene glycol | 8.0 | 8.0 | 8.0 | 8.0 | 8.0 |
| | | Propylene glycol | 5.0 | 5.0 | 5.0 | 5.0 | 5.0 |
| | | Glycerin | 5.0 | 5.0 | 5.0 | 5.0 | 5.0 |
| | | Polyethylene glycol 200 | | | | | |
| | | Water | 69.7 | 68.2 | 70.0 | 69.7 | 70.1 |
| Evaluation | Ink physical properties | Total aqueous solvents | 87.7 | 86.2 | 88.0 | 87.7 | 88.1 |
| | | Viscosity [mPa · s], Shear rate 1000 (1/s) | 14.6 | 8.8 | 7.0 | 7.1 | 9.8 |
| | | Viscosity [mPa · s], Shear rate 1 (1/s) | 986 | 42 | 89 | 206 | 41 |
| | | Viscosity [mPa · s], Ink drying rate 20%, (*1) | 4321 | 16 | 430 | 1020 | 216 |
| | | Viscosity [mPa · s], Ink drying rate 50%, (*1) | | | | | |
| | | Ink drying rate 20%, Loss tangent (tan δ) at 1% distortion | 0.441 | 0.421 | 0.532 | 0.481 | 2.44 |

TABLE I-continued

|   |   |   |   |   |   |   |   |
|---|---|---|---|---|---|---|---|
|   |   | Ink drying rate 20%, Crossover distortion [%] | 212% | 37% | 120% | 196% | None |
|   |   | Thixotropy index | 0.41 | 0.85 | 0.55 | 0.41 | 0.80 |
|   | Print propertie | Ejection performance | AA | AA | AA | AA | BB |
|   |   | Image quality (Pinning property) | AA | BB | BB | AA | BB |
|   |   | Substrate fixation (PET) | BB | BB | BB | BB | BB |
|   |   | Substrate fixation (glass) | AA | AA | 3B | BB | BB |
|   |   | Water resistance of coating film | AA | AA | BB | BB | BB |

TABLE II

|   |   |   | Example 11 | Example 12 | Example 13 | Example 14 | Example 15 |
|---|---|---|---|---|---|---|---|
| Composition (mass %) | Pigment | Magenta pigment | 4.0 | 4.0 | 4.0 | 4.0 | 4.0 |
|   | Pigment Dispersion | Joncryl 819 | 1.6 | 1.6 | 1.6 | 1.6 | 1.6 |
|   | Fixing resin | Polyester resin: Vylonal MD2000 | 5.0 | 5.0 | 5.0 | 5.0 | 5.0 |
|   |   | Polyacrylic resin: Mowinyl 6800D |   |   |   |   |   |
|   |   | Polyurethane resin: Evafanol HA-560 |   |   |   |   |   |
|   | Thixotropy-imparting agent | Cellulose nanofiber: Cellenpia TC-01A |   | 0.125 | 0.250 | 0.100 |   |
|   |   | Cellulose nanofiber: Cellenpia TC-02X |   |   |   |   |   |
|   |   | Smectite clay mineral: Laponite RD |   | 0.125 | 0.250 | 0.500 | 0.250 |
|   |   | Xanthan gum |   |   |   |   | 0.250 |
|   |   | Methyl cellulose resin: METOLOSE SM-4 | 0.500 |   |   |   |   |
|   | Surfactant | KF-351A | 0.2 | 0.2 | 0.2 | 0.2 | 0.2 |
|   |   | OLFINE E1010 | 1.0 | .0 | 1.0 | .0 | 1.0 |
|   | Aqueous solvent | Ethylene glycol | 8.0 | 8.0 | 8.0 | 8.0 | 8.0 |
|   |   | Propylene glycol | 5.0 | 5.0 | 5.0 | 5.0 | 5.0 |
|   |   | Glycerin | 5.0 | 5.0 | 5.0 | 5.0 | 5.0 |
|   |   | Polyethylene glycol 200 |   |   |   |   |   |
|   |   | Water | 69.7 | 70.0 | 69.7 | 69.6 | 69.7 |
|   |   | Total aqueous solvents | 87.7 | 88.0 | 87.7 | 87.6 | 87.7 |
| Evaluation | Ink physical properties | Viscosity [mPa·s], Shear rate 1000 (1/s) | 14.5 | 6.3 | 6.5 | 9.8 | 7.4 |
|   |   | Viscosity [mPa·s], Shear rate 1 (1/s) | 62 | 93 | 385 | 896 | 212 |
|   |   | Viscosity [mPa·s], Ink drying rate 20%, (*1) | 312 | 423 | 1817 | 4500 | 986 |
|   |   | Viscosity [mPa·s], Ink drying rate 50%, (*1) |   |   |   |   |   |
|   |   | Ink drying rate 20%, Loss tangent (tan δ) at 1% distortion | 1.67 | 0.482 | 0.431 | 0.421 | 0.521 |
|   |   | Ink drying rate 20%, Crossover distortion [%] | None | 190% | 313% | 312% | 145% |
|   |   | Thixotropy index | 0.84 | 0.53 | 0.35 | 0.36 | 0.40 |
|   | Print propertie | Ejection performance | BB | AA | AA | AA | AA |
|   |   | Image quality (Pinning property) | BB | AA | AA | AA | AA |
|   |   | Substrate fixation (PET) | BB | BB | BB | BB | BB |
|   |   | Substrate fixation (glass) | BB | AA | AA | AA | BB |
|   |   | Water resistance of coating film | BB | AA | AA | AA | BB |

|   |   |   | Example 16 | Example 7 | Comparative Example 1 | Comparative Example 2 | Comparative Example 3 |
|---|---|---|---|---|---|---|---|
| Composition (mass %) | Pigment | Magenta pigment | 4.0 | 4.0 | 4.0 | 4.0 | 4.0 |
|   | Pigment Dispersion | Joncryl 819 | 1.6 | 1.6 | 1.6 | 1.6 | 1.6 |
|   | Fixing resin | Polyester resin: Vylonal MD2000 | 5.0 | 5.0 | 5.0 | 5.0 | 5.0 |
|   |   | Polyacrylic resin: Mowinyl 6800D |   |   |   |   |   |
|   |   | Polyurethane resin: Evafanol HA-560 |   |   |   |   |   |
|   | Thixotropy-imparting agent | Cellulose nanofiber: Cellenpia TC-01A | 0.100 | 0.100 |   |   |   |
|   |   | Cellulose nanofiber: Cellenpia TC-02X |   |   |   |   |   |
|   |   | Smectite clay mineral: Laponite RD |   |   |   |   |   |
|   |   | Xanthan gum |   |   | 0.070 | 0.110 |   |
|   |   | Methyl cellulose resin: METOLOSE SM-4 |   |   |   |   |   |
|   | Surfactant | KF-351A | 0.2 | 0.2 | 0.2 | 0.2 | 0.2 |
|   |   | OLFINE E1010 | 1.0 | 1.0 | 1.0 | 1.0 | 1.0 |
|   | Aqueous solvent | Ethylene glycol | 26.6 | 30.0 |   |   | 26.6 |
|   |   | Propylene glycol | 5.0 | 5.0 |   |   | 5.0 |
|   |   | Glycerin | 5.0 | 5.0 | 25.0 | 25.0 | 5.0 |
|   |   | Polyethylene glycol 200 |   |   | 25.0 | 25.0 |   |
|   |   | Water | 51.5 | 48.1 | 38.1 | 38.1 | 51.6 |
|   |   | Total aqueous solvents | 88.1 | 88.1 | 88.1 | 88.1 | 88.2 |

TABLE II-continued

| Evaluation | | | | | | | |
|---|---|---|---|---|---|---|---|
| | Ink physical properties | Viscosity [mPa · s], Shear rate 1000 (1/s) | 10.7 | 10.7 | 14.5 | 18.6 | 6.3 |
| | | Viscosity [mPa · s], Shear rate 1 (1/s) | 51 | 51 | 52 | 76 | 6 |
| | | Viscosity [mPa · s], Ink drying rate 20%, (*1) | 302 | 302 | 142 | 202 | 10 |
| | | Viscosity [mPa · s], Ink drying rate 50%, (*1) | | | | | 140 |
| | | Ink drying rate 20%, Loss tangent (tan δ) at 1% distortion | 0.681 | 0.752 | 3.21 | 3.11 | 11.2 |
| | | Ink drying rate 20%, Crossover distortion [%] | 100% | 101% | None | None | None |
| | | Thixotropy index | 0.78 | 0.78 | 0.88 | 0.85 | 1.00 |
| | Print propertie | Ejection performance | AA | AA | BB | CC | AA |
| | | Image quality (Pinning property) | AA | AA | CC | BB | CC |
| | | Substrate fixation (PET) | BB | BB | BB | BB | BB |
| | | Substrate fixation (glass) | BB | BB | BB | BB | BB |
| | | Water resistance of coating film | AA | AA | BB | BB | BB |

As can be seen from Tables I and II, inkjet printing using the inks in the examples provides good ink ejection from the head and high-quality printed images were obtained. Regarding (A5) loss tangent (tan δ) at an ink drying rate of 20% and (A6) crossover distortion at an ink drying rate of 20%, in Examples 10 and 11, unlike other examples, tan δ of less than 1% or crossover distortion of 20% or more has not been achieved. As a result, the evaluation is slightly lower than the other examples in terms of ejection performance and image quality (pinning). Among the thixotropy-imparting agents, cellulose nanofibers and smectite clay minerals are considered to form a specific gel structure that can achieve tan δ of less than 1% and crossover distortion of 20% or more.

INDUSTRIAL AVAILABILITY

According to the inkjet ink of the present invention, it is possible to maintain both good ejection performance and high-quality image formation in image formation by the inkjet method. Further, according to the image formation of the present invention, it is possible to form a high-quality image with good workability in the image formation by the inkjet method.

DESCRIPTION OF SYMBOLS

1: Inkjet head (End shooter type)
11: Inkjet head (MEMS type)
2: Head chip
21: Nozzle plate
22: Nozzle
23: Ink channel
24: Piezoelectric element
25: Dummy channel
26a: Individual ink circulation channel
28: Channel forming groove
3: Circuit board
31a: Injection hole
31b: Discharge hole
31c: Introduction hole
4: Ink manifold
41: Common ink chamber
412: Ink discharge chamber
421: Common ink circulation channel
422: Groove
423: Circulation path
424: Discharge channel
425: Introduction path
425a: Introduction groove
45: Partition
5a: Ink supply tube
5b: Ink recovery tube
5c: Ink discharge tube
5d: Circulation path connection
6: Buffer space section
7a: Connection
7b: Connection
F1: Main flow path
F2: Sub-flow path
100: Inkjet image forming apparatus
101: Ink tank
102: Ink transfer tube
103: Ink return tube
104: Control section
104a: Control section
105B: Transfer pump
105b: Return pump
107: Carriage mechanism
108: Conveying device
109: Substrate
110a: Transfer pressure control pump
110b: Return pressure control pump
111A: Transfer side sub-tank
111B: Return side sub-tank

What is claimed is:

1. An inkjet ink comprising an aqueous solvent, a pigment, and a thixotropy-imparting agent, having a viscosity at 25° C. at a shear rate of 1000 (1/s) of 15 mPa·s or less, and a viscosity at 25° C. at a shear rate of 1 (1/s) of 150 mPa·s or more in a state where the aqueous solvent is removed from the inkjet ink so that a mass is 80% of an initial mass of the inkjet ink.

2. The inkjet ink according to claim 1, wherein in a state where the aqueous solvent is removed from the inkjet ink so that a mass is 80% of an initial mass of the inkjet ink, and when a distortion is changed under measurement conditions where a temperature is 25° C., an angular frequency ω is 10 rad/s, and a swing angle γ is 1 to 1000%, a loss tangent (tan δ) is less than 1 at 1% distortion.

3. The inkjet ink according to claim 1, wherein in a state where the aqueous solvent is removed from the inkjet ink so that a mass is 80% of an initial mass of the inkjet ink, and when a distortion is changed under measurement conditions where a temperature is 25° C., an angular frequency ω is 10 rad/s, and a swing angle γ is 1 to 1000%, a crossover distortion between a storage elastic modulus and a loss elastic modulus is 20% or more.

4. The inkjet ink according to claim 1, having a thixotropy index represented by n in the following viscosity equation of Equation (2) is 0.85 or less, $$\eta a = \mu D^{n-1} \quad \text{Equation (2):}$$

in Equation (2), ηa represents an apparent viscosity; D represents a shear rate; μ represents a non-Newtonian viscosity coefficient.

5. The inkjet ink according to claim 1, wherein an aspect ratio of the thixotropy-imparting agent is 20 or more.

6. The inkjet ink according to claim 1, wherein the thixotropy-imparting agent contains a polysaccharide or inorganic particles.

7. The inkjet ink according to claim 1, wherein the thixotropy-imparting agent contains a cellulose nanofiber or a smectite clay mineral.

8. The inkjet ink according to claim 1, wherein the thixotropy-imparting agent is composed of two or more materials.

9. The inkjet ink according to claim 8, wherein the thixotropy-imparting agent contains a smectite clay mineral.

10. The inkjet ink according to claim 8, wherein the thixotropy-imparting agent contains a smectite clay mineral and a cellulose nanofiber.

11. The inkjet ink according to claim 1, further containing a fixing resin, wherein the thixotropy-imparting agent is contained in the range of 0.01 to 1 mass % and a total solid content of thixotropy-imparting agent is in the range of 6 to 30 mass % with respect to the total inkjet ink.

12. An image forming method comprising the step of: ejecting droplets of an inkjet ink from an inkjet head equipped with an ink circulation mechanism and landing the droplets of the inkjet ink on a substrate, wherein the inkjet ink contains an aqueous solvent, a pigment, and a thixotropy-imparting agent, and the inkjet ink is circulated in the inkjet head so that a viscosity of the inkjet ink is 15 mPa·s or less, and when the droplets of the inkjet ink are landed on the substrate, or immediately after landing of the droplets of the inkjet on the substrate, a mass loss of the droplets of the inkjet ink from the inkjet ink is 20% or less, and a viscosity of the droplets of the inkjet ink is 150 mPa·s or more.

13. The image forming method according to claim 12, using an inkjet ink comprising an aqueous solvent, a pigment, and thixotropy-imparting agent, having a viscosity at 25° C. at a shear rate of 1000 (1/s) of 15 mPa·s or less, and a viscosity at 25° C. at a shear rate of 1 (1/s) of 150 mPa·s or more in a state where the aqueous solvent is removed from the inkjet ink so that a mass is 80% of an initial mass of the inkjet ink.

14. The image forming method according to claim 12, wherein the substrate is a non-absorbent substrate.

15. The image forming method according to claim 12, wherein the landing step of the droplets of the inkjet ink contains a process of heating the droplets on the substrate in the range of 30 to 60° C.

16. The image forming method according to claim 12, wherein the immediately after landing of the droplets of the inkjet ink is a period within 100 msec after the droplet lands on the substrate.

17. The image forming method according to claim 12, wherein the inkjet head is provided with:
- a pressure chamber into which the inkjet ink is injected via an injection path;
- a pressure generating device for causing a pressure fluctuation in the pressure chamber;
- a nozzle that communicates with the pressure chamber and serves as a flow path for the inkjet ink ejected from the pressure chamber to the outside due to pressure fluctuation in the pressure chamber; and
- two or more circulation paths that communicate with the pressure chamber, eject the inkjet ink inside the nozzle, and return the inkjet ink to the injection path.

* * * * *